W. N. PARKES.
EMBROIDERY MACHINE.
APPLICATION FILED DEC. 19, 1913.
1,305,927.
Patented June 3, 1919.
18 SHEETS—SHEET 1.
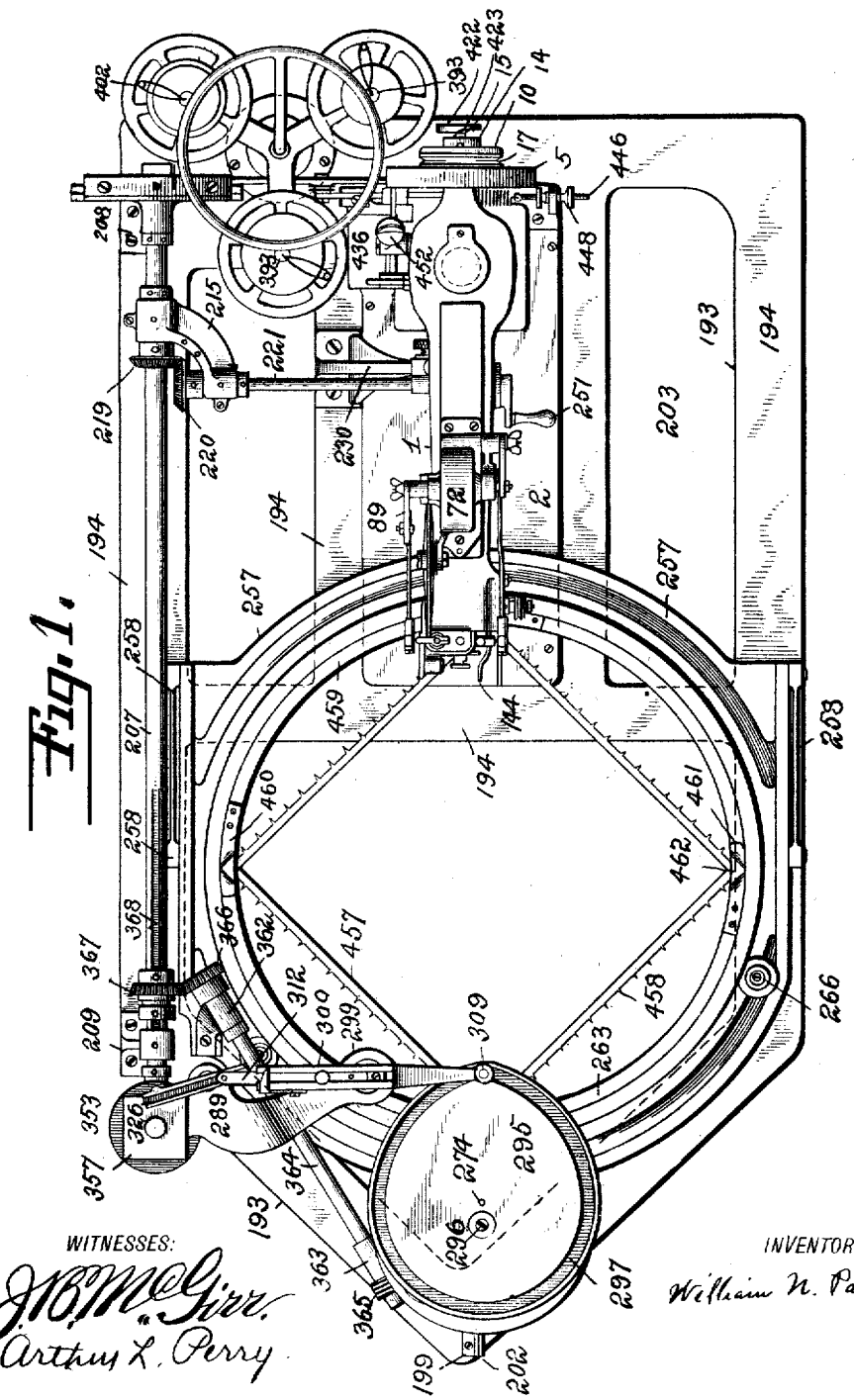

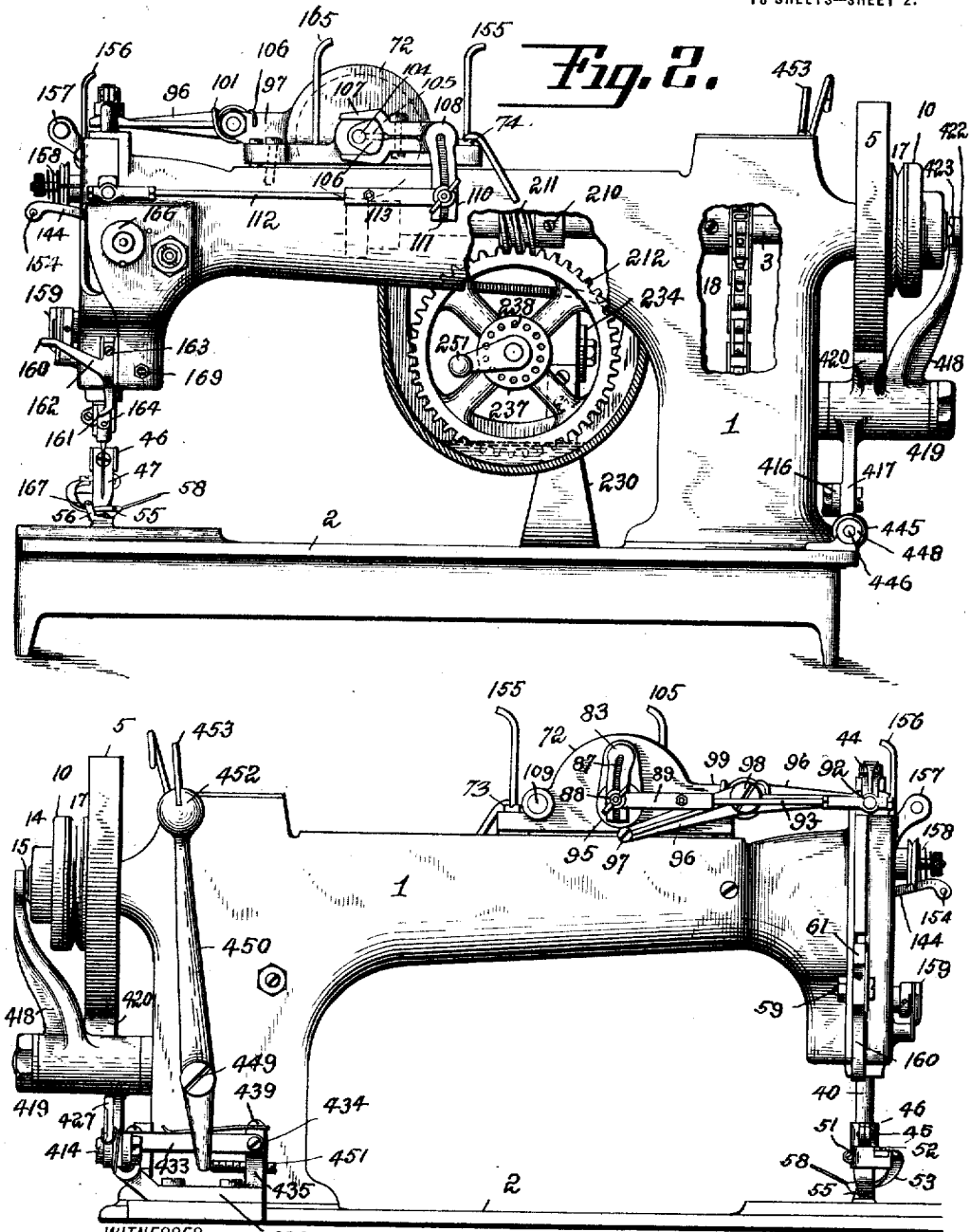

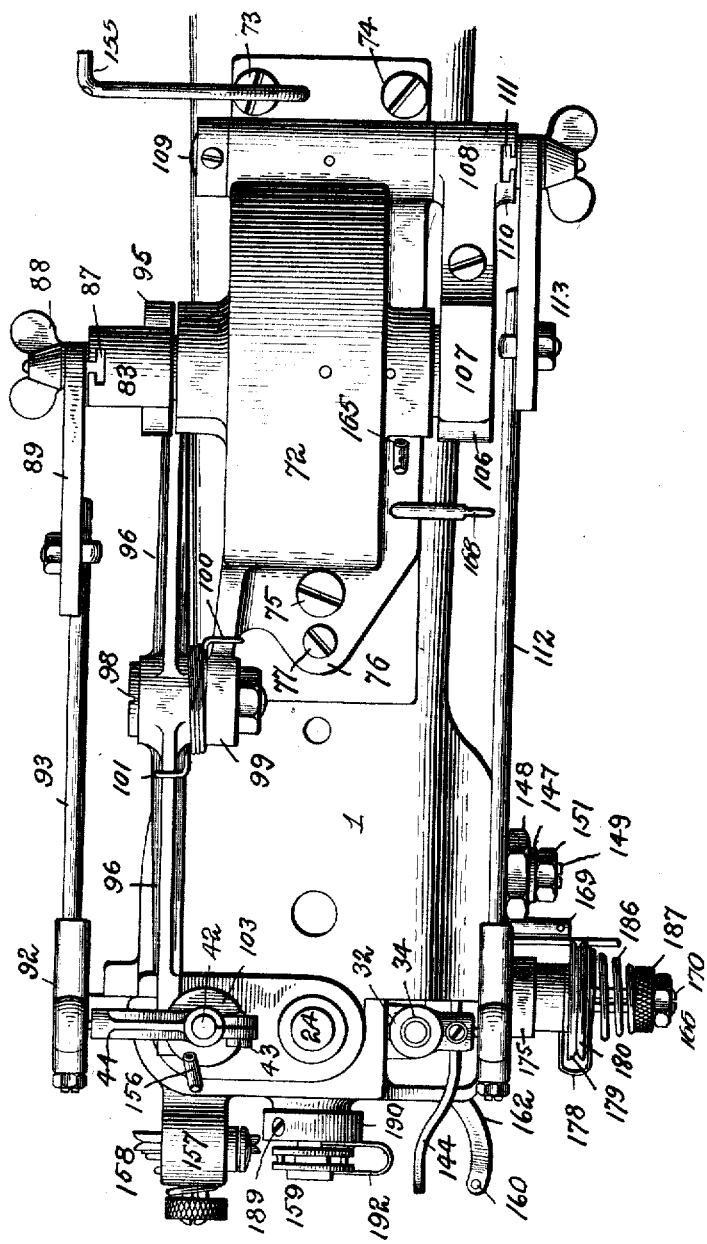

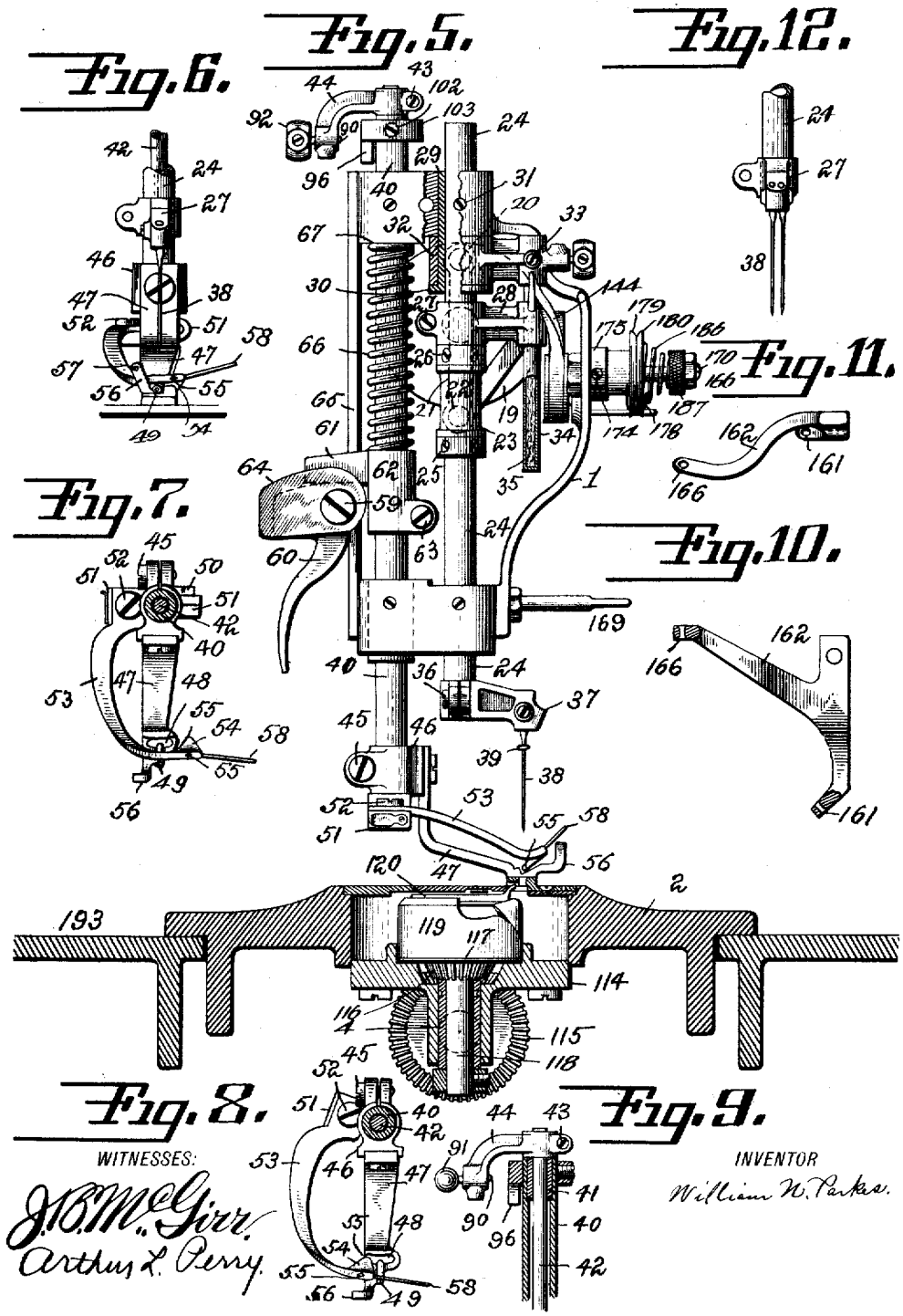

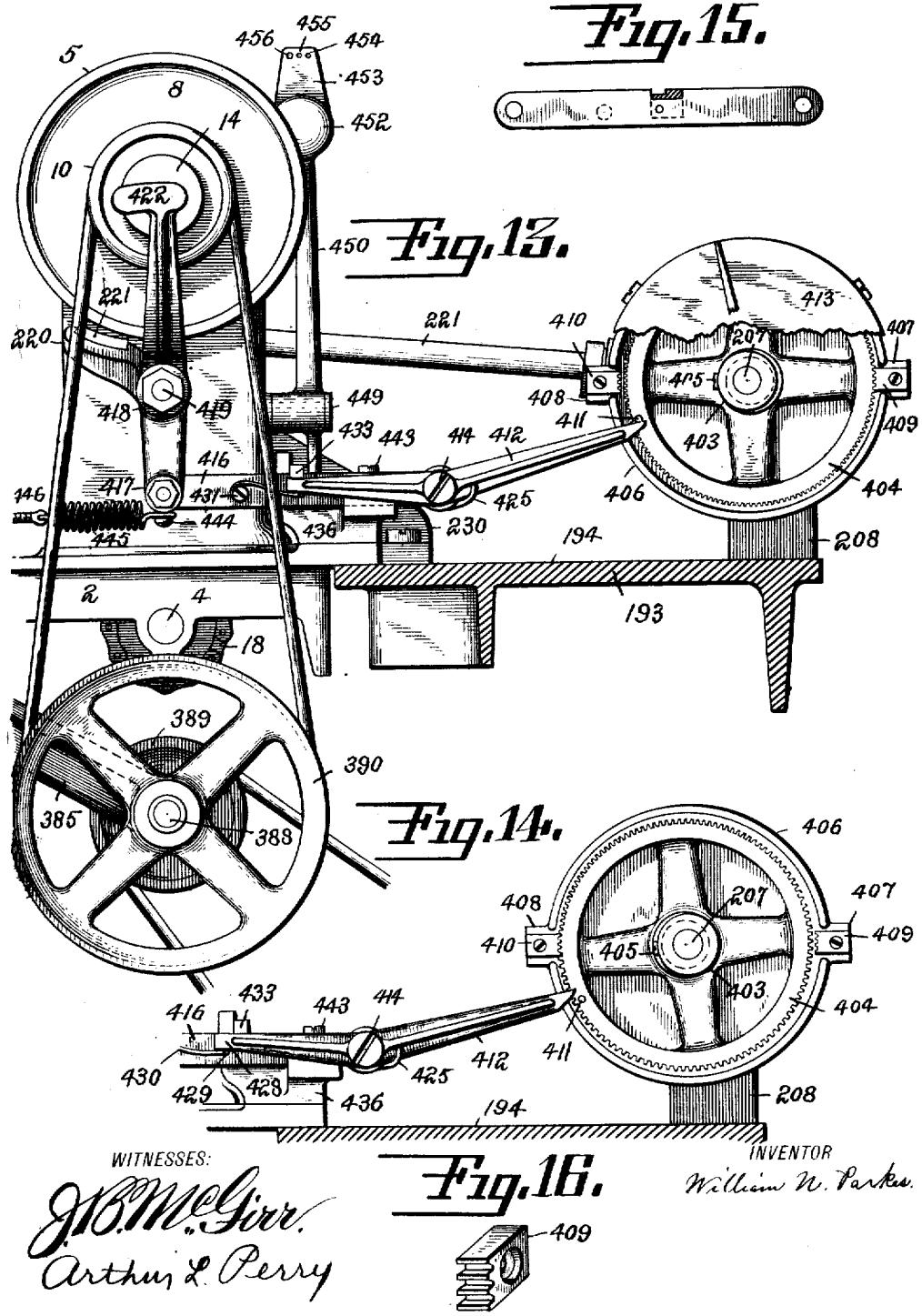

W. N. PARKES.
EMBROIDERY MACHINE.
APPLICATION FILED DEC. 19, 1913.
1,305,927.
Patented June 3, 1919.
18 SHEETS—SHEET 6.
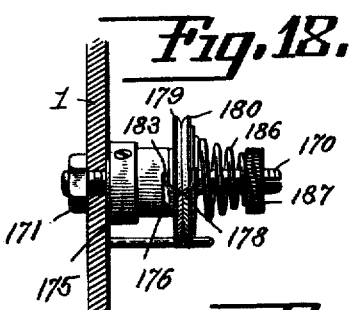
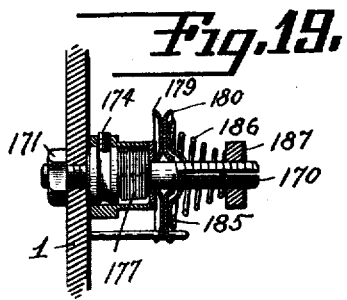
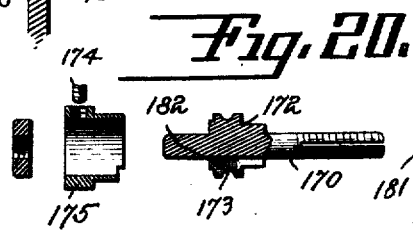
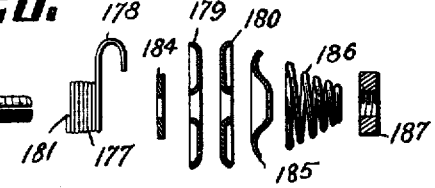
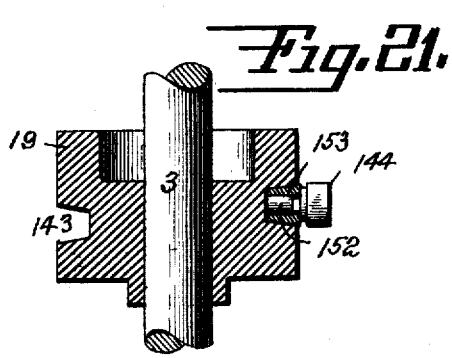
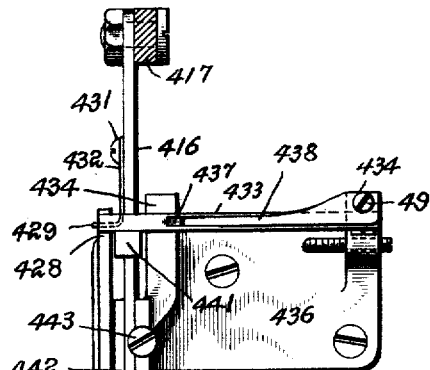
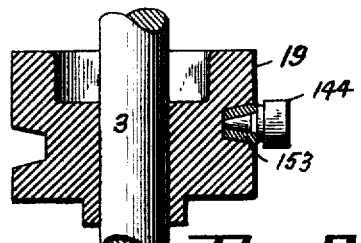
WITNESSES:
J. B. McGirr.
Arthur L. Perry
INVENTOR
William N. Parkes.

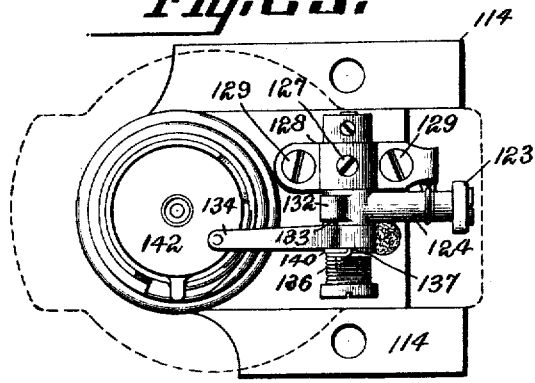
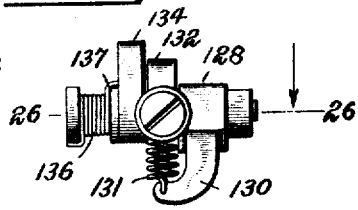
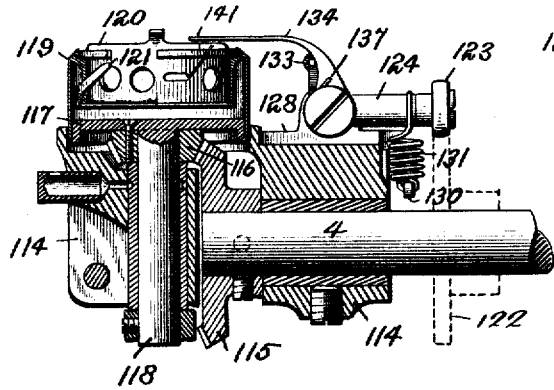
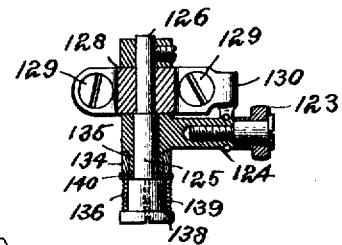
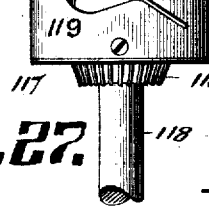
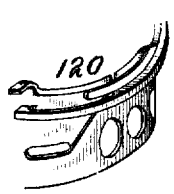
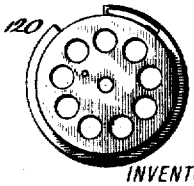

W. N. PARKES.
EMBROIDERY MACHINE.
APPLICATION FILED DEC. 19, 1913.
1,305,927.
Patented June 3, 1919.
18 SHEETS—SHEET 8.
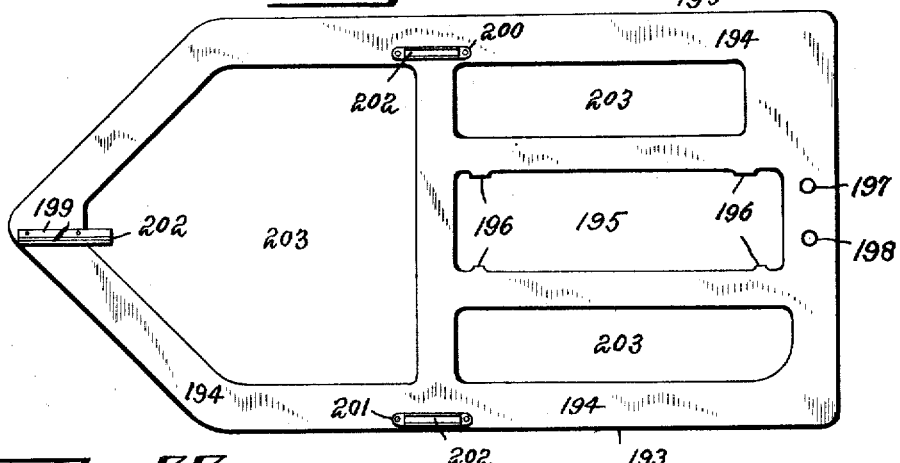
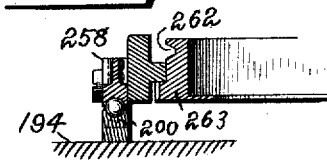
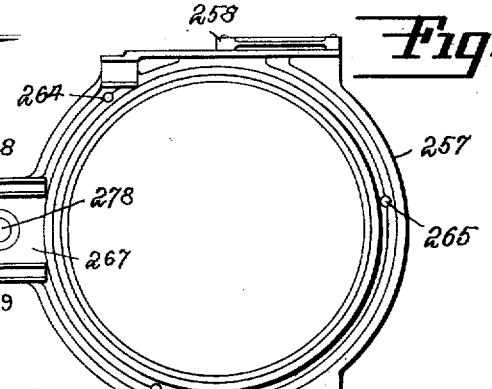
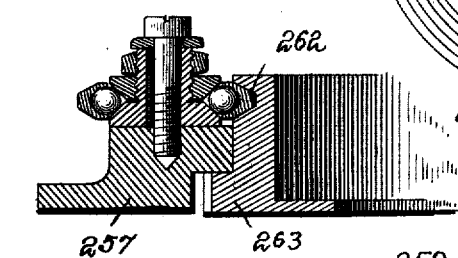
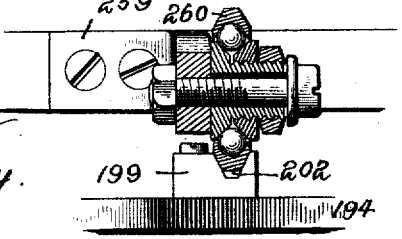
WITNESSES:
J.B. McGirr.
Arthur L. Perry.
INVENTOR
William N. Parkes.

W. N. PARKES.
EMBROIDERY MACHINE.
APPLICATION FILED DEC. 19, 1913.

1,305,927.

Patented June 3, 1919.
18 SHEETS—SHEET 9.

WITNESSES:
J. B. McGirr.
Arthur L. Perry

INVENTOR
William N. Parkes.

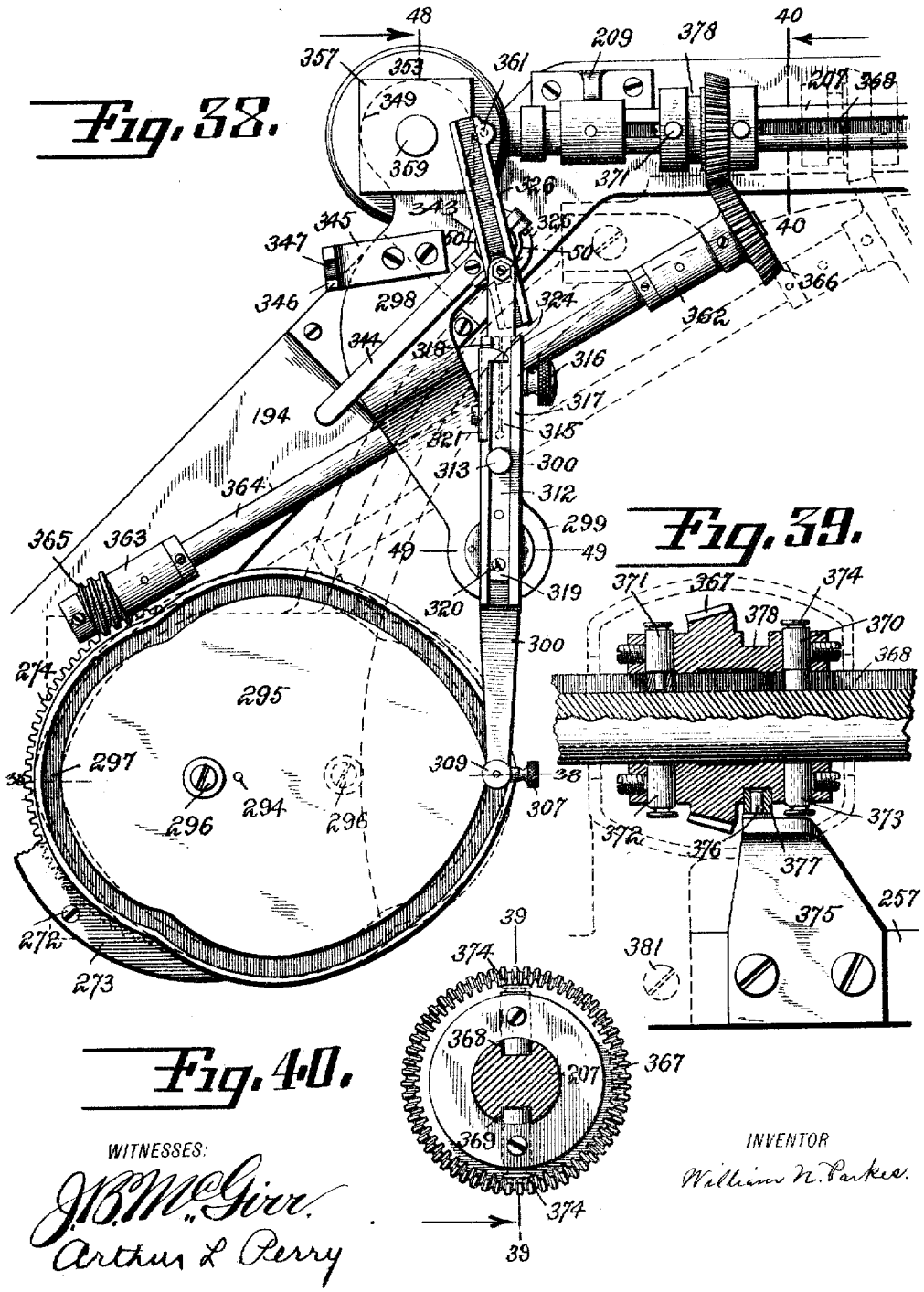

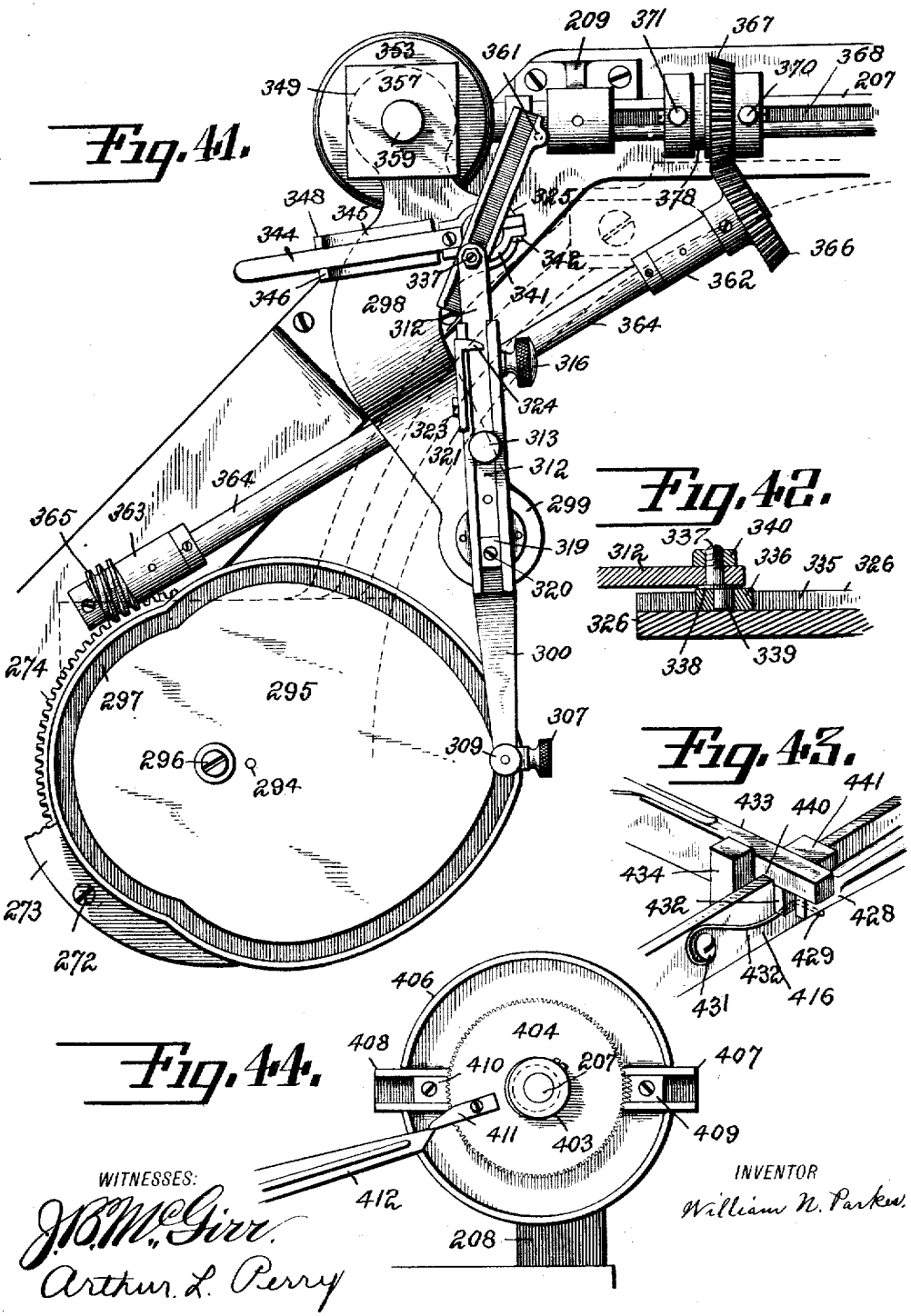

W. N. PARKES.
EMBROIDERY MACHINE.
APPLICATION FILED DEC. 19, 1913.

1,305,927.

Patented June 3, 1919.
18 SHEETS—SHEET 12.

WITNESSES:
J. B. McGirr.
Arthur L. Perry.

INVENTOR
William N. Parkes.

W. N. PARKES.
EMBROIDERY MACHINE.
APPLICATION FILED DEC. 19, 1913.
1,305,927.
Patented June 3, 1919.
18 SHEETS—SHEET 13.
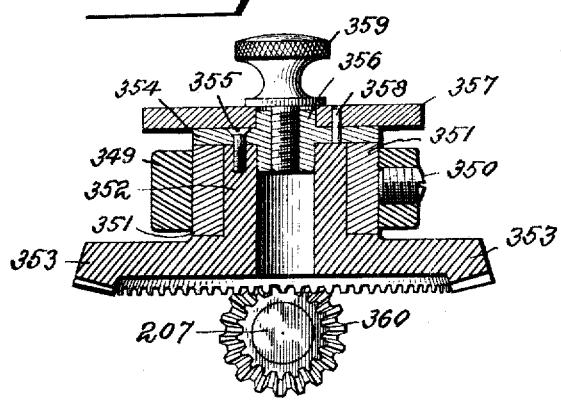
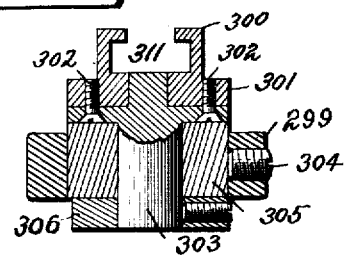
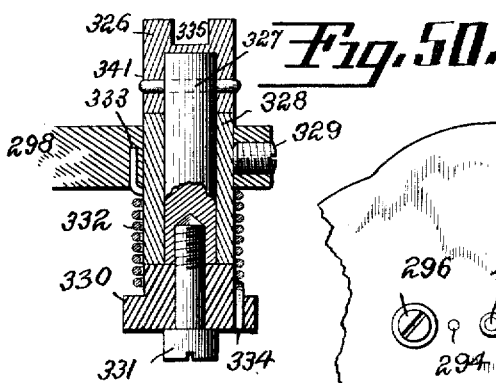
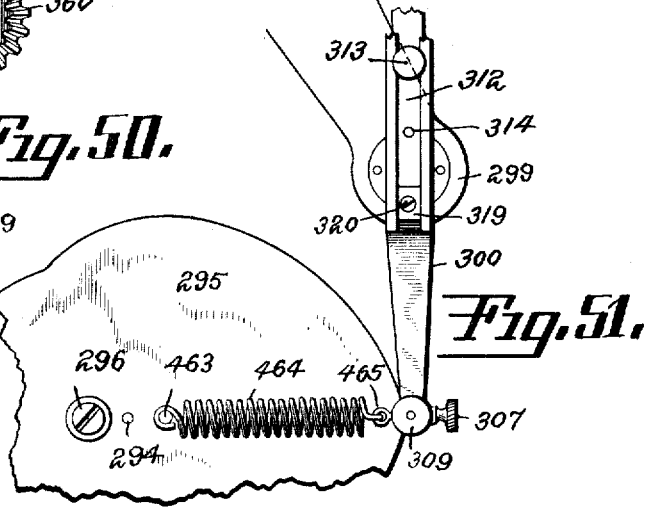
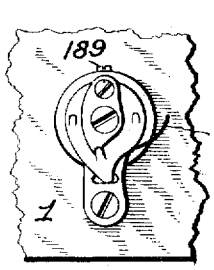
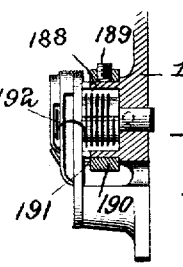
WITNESSES:
J.B. McGirr.
Arthur L. Perry
INVENTOR
William N. Parkes.

W. N. PARKES.
EMBROIDERY MACHINE.
APPLICATION FILED DEC. 19, 1913.
1,305,927.
Patented June 3, 1919.
18 SHEETS—SHEET 14.
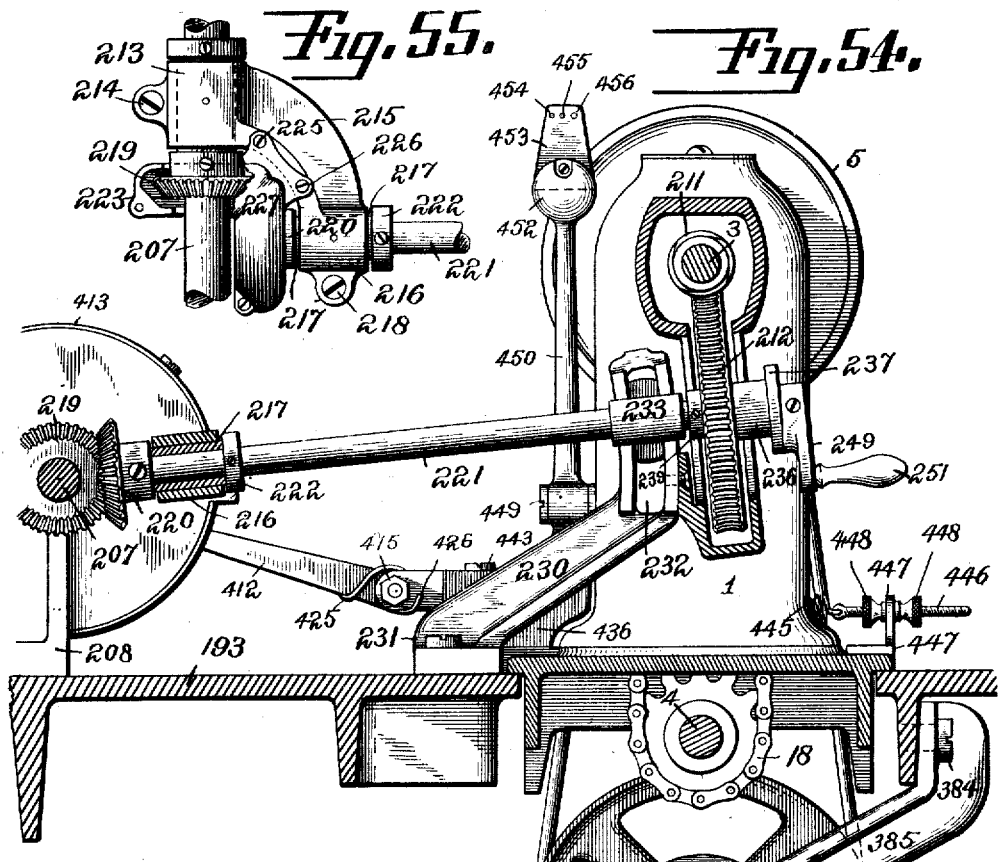
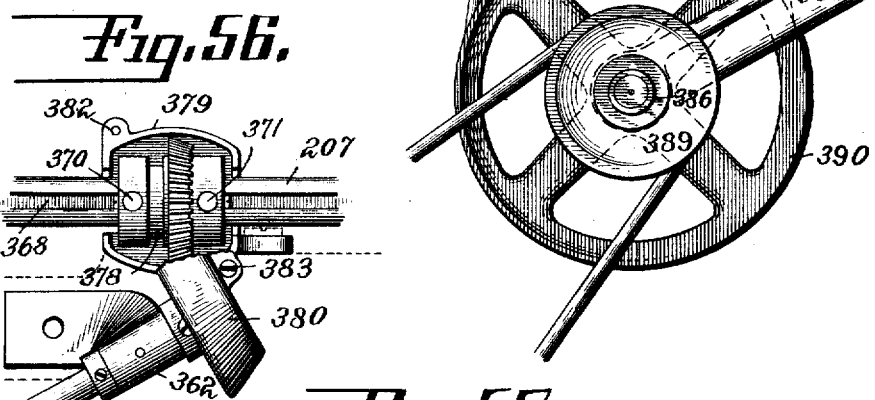
INVENTOR
William N. Parkes.
WITNESSES:
J. B. McGirr.
Arthur L. Perry.

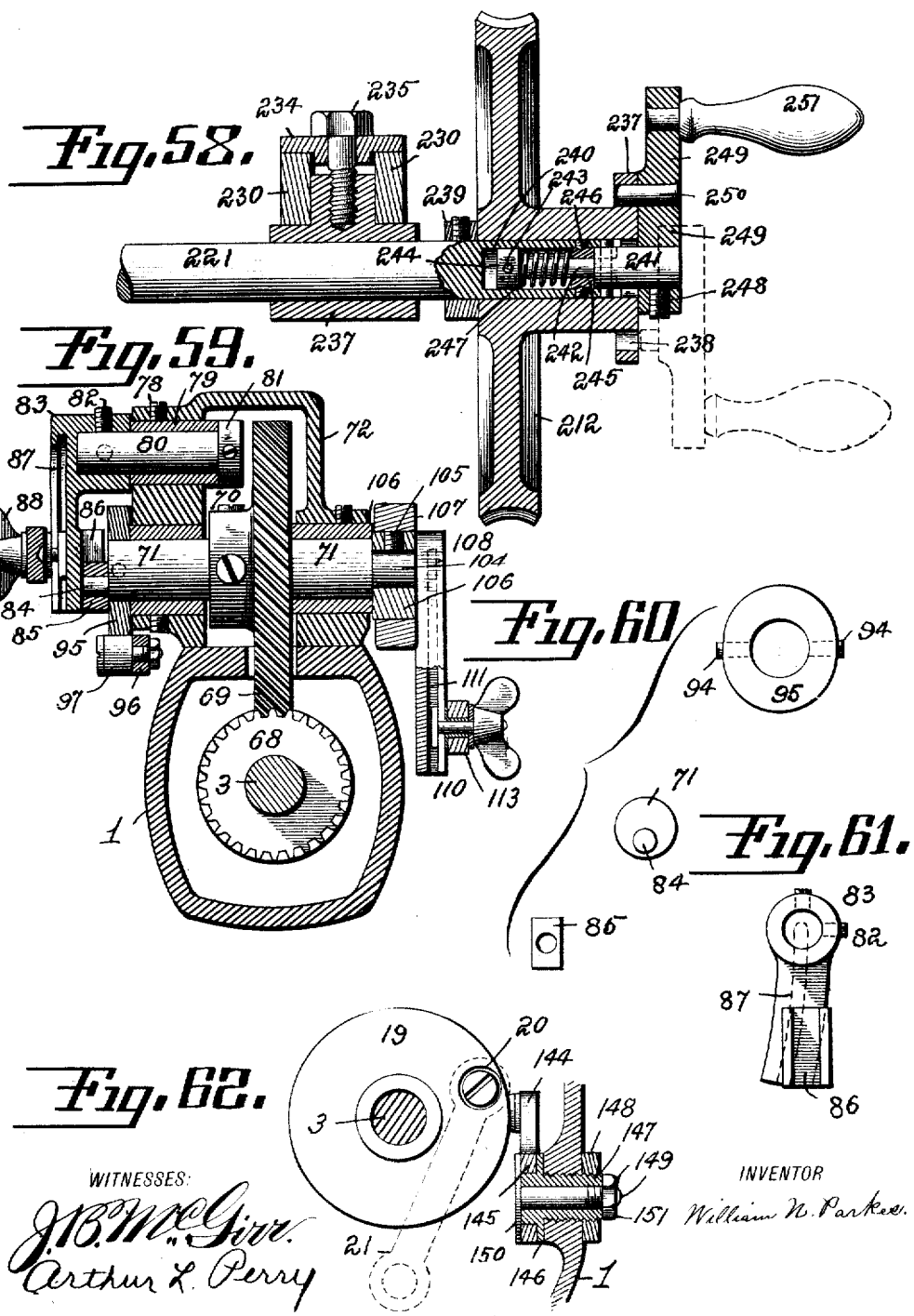

W. N. PARKES.
EMBROIDERY MACHINE.
APPLICATION FILED DEC. 19, 1913.
1,305,927.
Patented June 3, 1919.
18 SHEETS—SHEET 16.
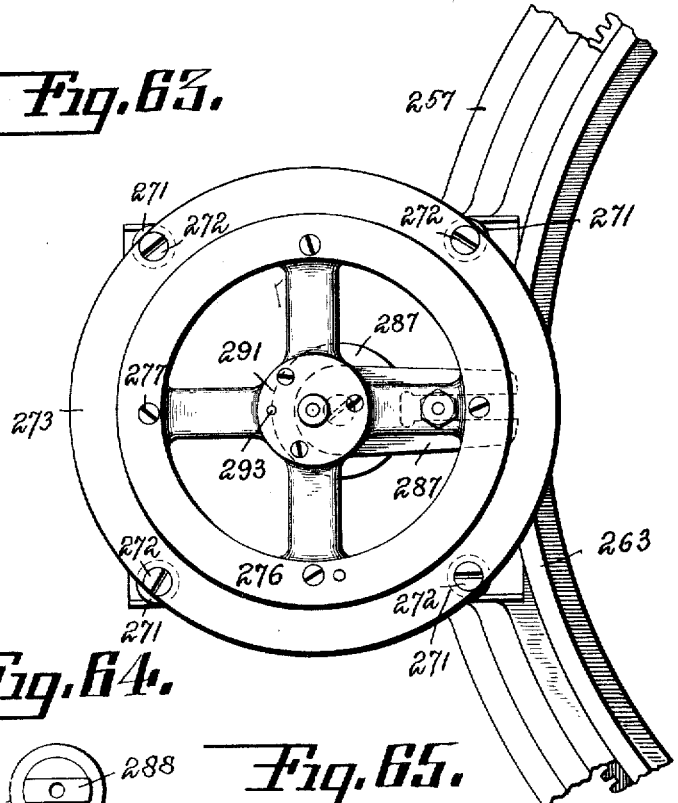
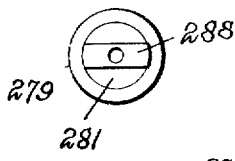
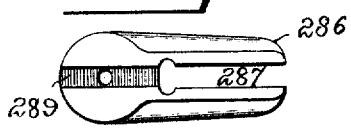
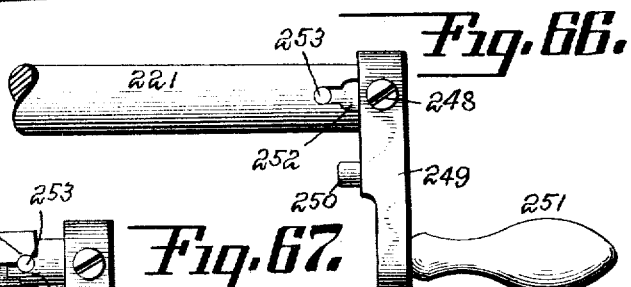
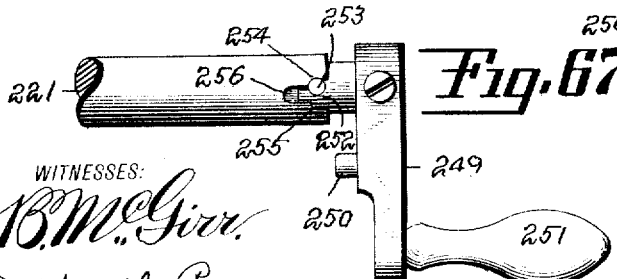
WITNESSES:
J. B. McGirr.
Arthur L. Perry
INVENTOR
William N. Parkes.

W. N. PARKES.
EMBROIDERY MACHINE.
APPLICATION FILED DEC. 19, 1913.
1,305,927.
Patented June 3, 1919.
18 SHEETS—SHEET 17.
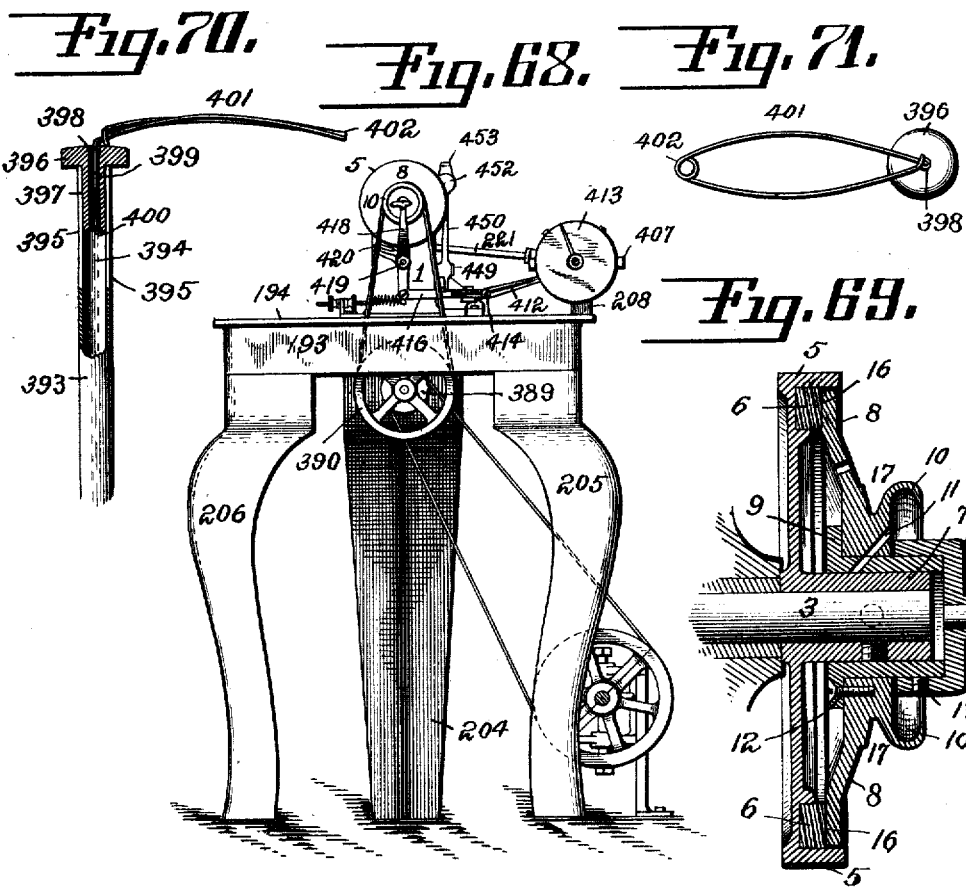
WITNESSES:
INVENTOR
William N. Parkes W. N. PARKES.
EMBROIDERY MACHINE.
APPLICATION FILED DEC. 19, 1913.
1,305,927.
Patented June 3, 1919.
18 SHEETS—SHEET 18.
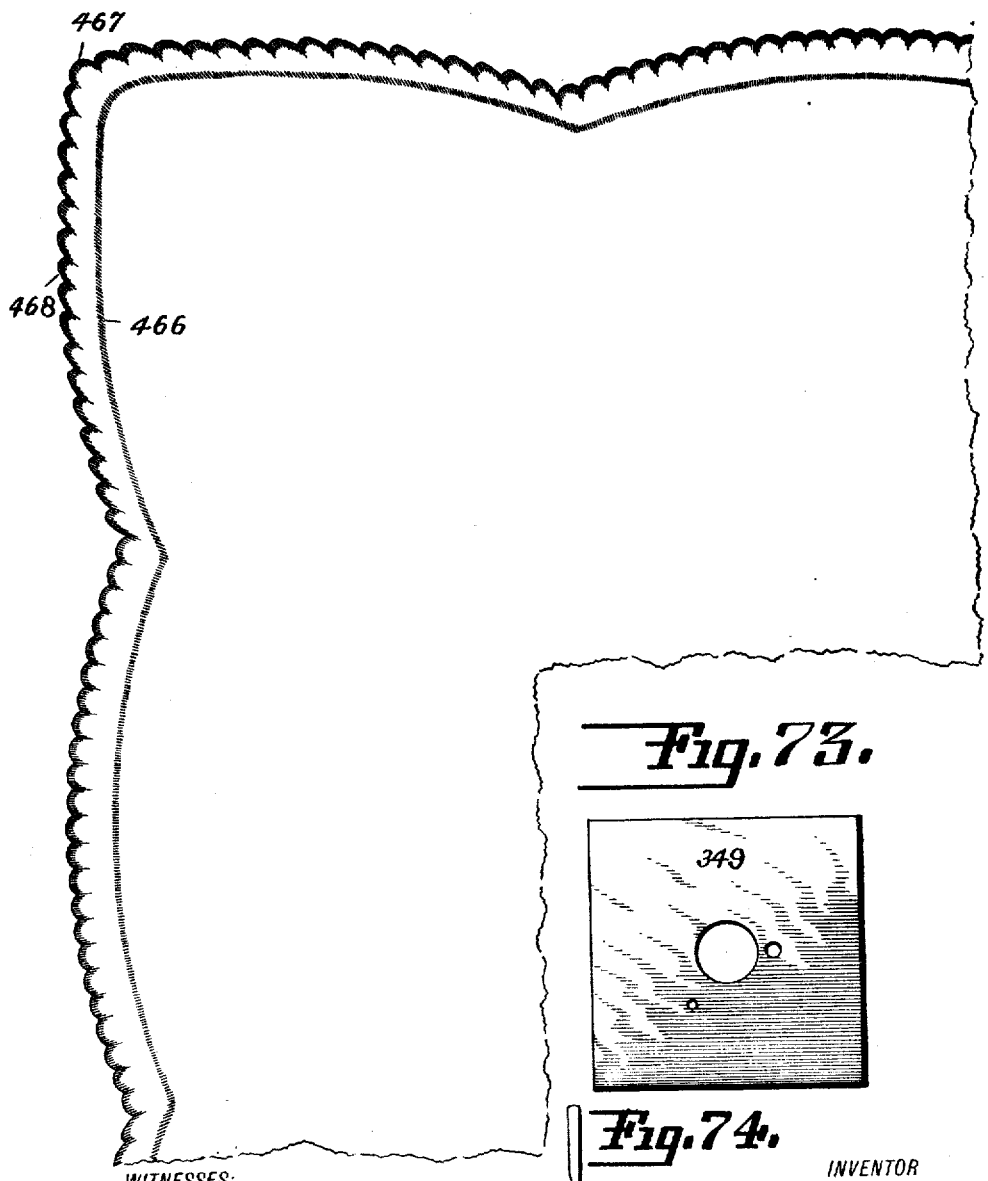
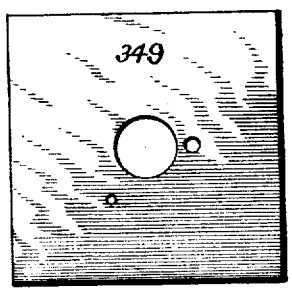
WITNESSES:
J. B. McGirr.
Arthur L. Perry
INVENTOR
William N. Parkes.

UNITED STATES PATENT OFFICE.

WILLIAM N. PARKES, OF BROOKLYN, NEW YORK, ASSIGNOR TO L. S. E. CO. INC., OF BROOKLYN, NEW YORK, A CORPORATION OF NEW YORK.

EMBROIDERY-MACHINE.

1,305,927.        Specification of Letters Patent.     Patented June 3, 1919.

Application filed December 19, 1913. Serial No. 807,785.

*To all whom it may concern:*

Be it known that I, WILLIAM N. PARKES, a citizen of the United States, residing in the borough of Brooklyn, in the county of Kings and State of New York, have invented new and useful Improvements in Embroidery-Machines, of which the following is a specification.

This invention relates to embroidery or ornamental stitching machines of a class such as is shown by me in United States Patents Numbers 693,666, issued to applicant February 18, 1902, 875,626, December 31, 1907, 946,150, January 11, 1910, 1,027,064, May 21, 1912.

A sewing machine is said to have made a stitch when the stitch-forming mechanism has anchored the thread in the material at the point where the needle previously penetrated it. For the purpose of clearness in this application the portion of the needle thread which runs from one to another of these stitches is called a link of needle thread.

It is common in sewing machines to pass back and forth under one or more vertically reciprocating needles a finger carrying an auxiliary thread or cord, such for example as is shown in the above mentioned U. S. Patent #946,150.

By referring to Figure 10 of said patent it will be seen that the links of needle thread running from one to another of the stitches merely cross the auxiliary thread and thereby appliqué it to the surface of the fabric.

In U. S. Patent No. 875,628 scalloping embroidery machine, issued to me Dec. 31, 1907, a looper loops an auxiliary thread successively around each link of the needle thread as illustrated in Fig. 16 of the patent. And to draw the threads to the edge as illustrated in Fig. 17 the looper is moved a greater distance to the right, than it is to the left, of the center of the zone of operation of the needle.

In the machine of this patent the working position of the needle is changed laterally to locate the stitches in the material to make the embroidered scallops. In the machine of U. S. Patent #875,625 issued to me December 31, 1907 the same kind of embroidery stitches are made, that is, an auxiliary thread is looped around successive links of the needle thread, but, to locate the stitches to make embroidered scallops the work instead of the working position of the needle, is moved laterally.

In the use of the two machines mentioned the work is guided manually, so one operator is required for each machine, but, in the use of the machines of the Patents #693,666—875,626 and 1,027,064, the work is guided automatically, so one operator can attend to a number of machines of this type.

In the machine of my present application the work is guided automatically, but, by different means from that which is disclosed in the patents mentioned in the preceding paragraph. In the machines of the former patents the work moving mechanism is operated through the movements of pawl operated ratchet wheels, while in the machine of my present application it is operated by gear operated mechanism. As a result of this improvement the latter machine may be run at a very much higher speed, and the trouble and damage to the work, caused by the ratchet operated mechanisms getting out of time, is avoided.

In the machines of Patents 875,628 and 946,150, the means that engage the work, namely the feed dog in one case and the feed wheel in the other, do not move with the work, while, in the machines of Patents 693,666—875,626, and 1,027,064, the work is clamped in a frame or carrier which moves with the work. In the latter mentioned machines a second row of short lateral stitches is made along the edge of the embroidered path to produce the buttonhole finish, as shown in Fig. 73 of the Patent 1,119,449, or the embroidered path is composed of long and short stitches, the short stitches being along the edge of the path and serving for the buttonhole finish, as shown in Fig. 26 of U. S. Patent 875,624 issued to me Dec. 31, 1907. In my present application the making of the row of short lateral stitches along the edge of the embroidered path is dispensed with, and the buttonhole finish is made by looping the auxiliary thread around links of the needle thread along the edge of a single row of lateral stitches, thereby practically doubling the production of my former machines in which the work is held in a carrier and the latter is moved automatically.

The main objects of my present invention are: 1st, the providing of suitably constructed gear operated mechanism for use in automatic embroidery machines of the character disclosed in the patents I have mentioned. 2nd, to construct the machine of my present invention so it is especially adapted to embroider handkerchiefs or other square articles. 3rd to adapt for use, and combine with machines in which the work is guided automatically, means for looping an auxiliary thread around links of the needle thread. 4th to provide the mechanism so constructed that when operated the looped auxiliary thread is yieldingly drawn to the edge of the embroidered path thereby making a button hole finish along the same. These and other objects will be disclosed in connection with the specification, and the claims.

Referring to the drawings, Fig. 1 is a top plan view of the machine;

Fig. 2 is a front view of the head of the machine detached from the table, parts broken away to show the manner of drive, and Fig. 3 is a rear view of the same with certain parts omitted;

Fig. 4 is a top plan view, full size, of the forward end of the arm,

Fig. 5 is a face view of the arm with the face plate removed and a sectional view of the base to show the location and relation of the co-acting parts of the stitch forming and auxiliary looper mechanism.

Fig. 6 is a front view of the lower part of the needle bar with its needle clamp and needle, presser foot and auxiliary looper.

Fig. 7 is a top plan view of the presser and auxiliary bars in cross section, with the auxiliary looper in one of its extreme positions, and Fig. 8 is a like view showing the auxiliary looper in its other extreme position.

Fig. 9 is a view of the upper end of the presser and auxiliary bar showing the manner of arrangement of the parts and means for connecting a drive to the same.

Fig. 10 is a side view of a thread guide, with the parts through which the thread passes in section, and Fig. 11 is a top plan view of the same.

Fig. 12 is a view of a needle bar, and clamp carrying two needles.

Fig. 13 is an end view of the machine parts broken away and in section so as to show the stop motion in position of commencing to trip, and Fig. 14 is a detached detail showing the stop motion after having been tripped. Fig. 15 is a detail of the catch link of the stop motion;

Fig. 16 is a detail of one of the toothed segments that forms a part of the stop motion;

Fig. 17 is a top plan view of the tripping part of the stop motion mechanism;

Fig. 18 is a side view of a thread tension, parts in position for threading;

Fig. 19 is a vertical sectional view of the same, the central stud is shown in elevation;

Fig. 20 is a detailed vertical sectional view of all the parts in position to be assembled;

Fig. 21 is a sectional view of the take up cam and Fig. 22 shows a modification of the same;

Fig. 23 is a detached plan view of the hook mechanism and bobbin controller and Fig. 24 is vertical sectional view of the same and Figs. 25 and 26 are details of the controller device;

Fig. 27 is a side view of hook, Fig. 28 detail of the bobbin case, Fig. 29 is a top plan view of the auxiliary hook, Fig. 30 is a bottom plan view of the hook and bobbin case.

Figure 36:
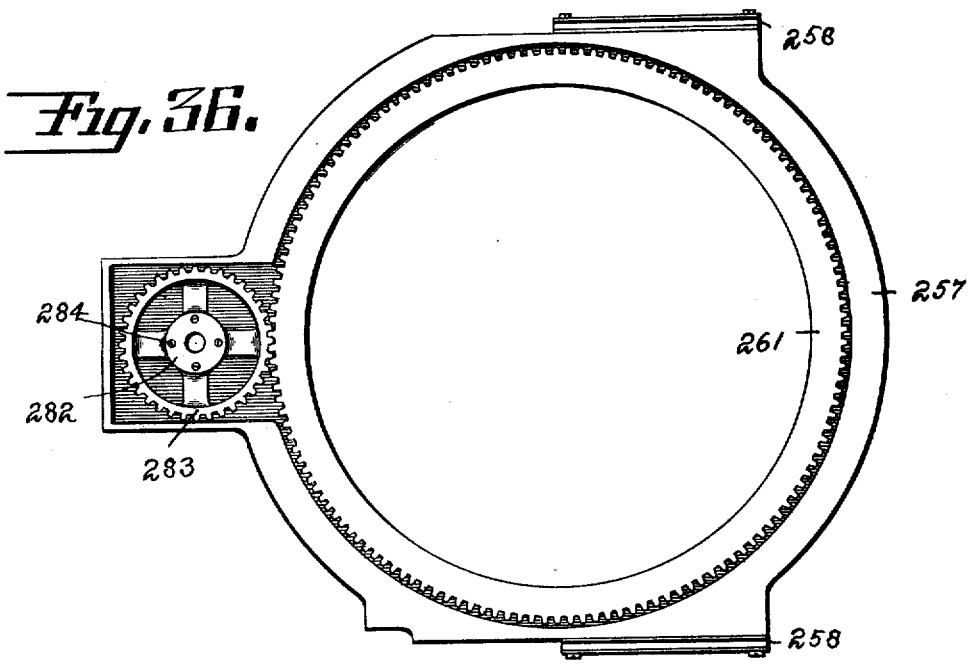
Figure 37:
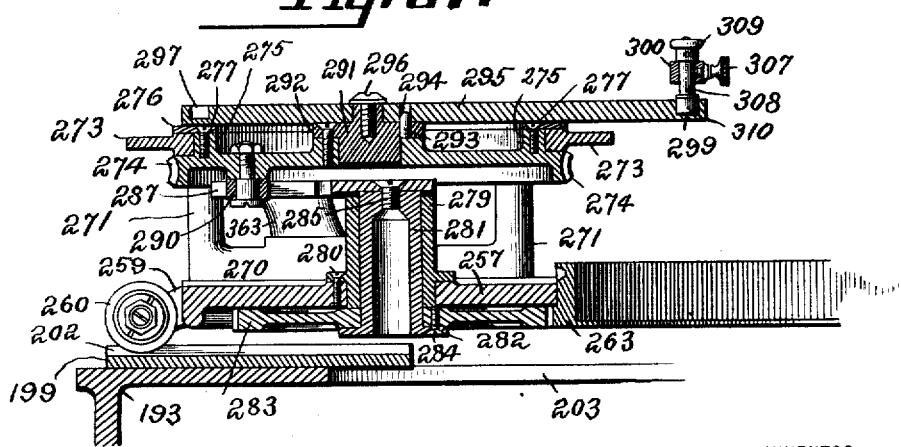

Fig. 31 is a top plan view of the table and Fig. 32 is a top plan view of the work carrier frame, Figs. 33, 34 and 35 are details in connection with the work carrier; Fig. 36 is a bottom plan view of the work carrier frame showing the work carrier gears in position; Fig. 37 is a vertical sectional view on lines 38—38 of Fig. 38.

Fig. 38 is a top plan view of a part of the work carrier operating mechanism, showing the cam actuating means for operating the same, and Figs. 39 and 40 show details of cam, of the power transmission means for operating the work carrier mechanism, and Fig. 41 shows the work carrier operating mechanism with the secondary cam lever adjusted out of action; Fig. 42 is a detail in connection with the secondary cam transmission lever.

Fig. 43 is an enlarged perspective view of the latch and catch of the stop motion, and Fig. 44 is a modification in connection with the stop motion.

Figure 45:
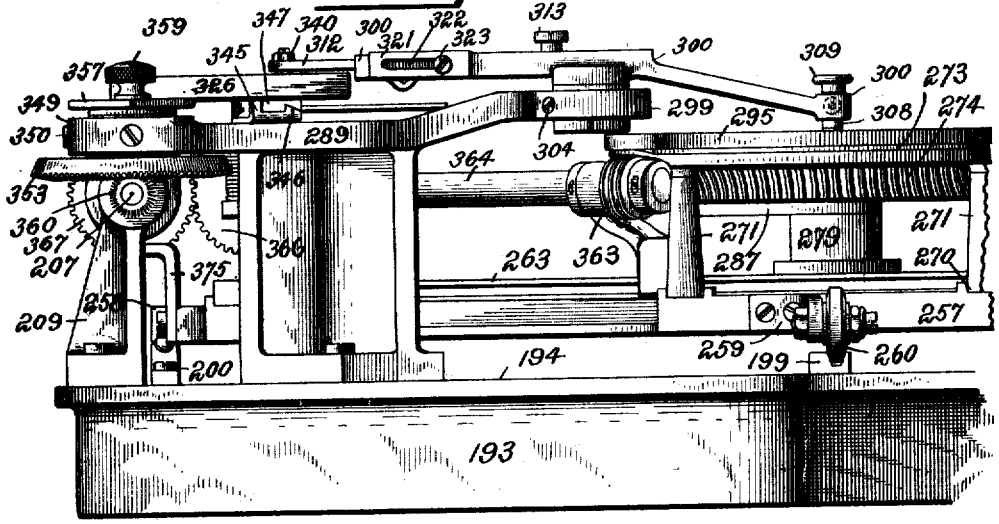
Figure 46:
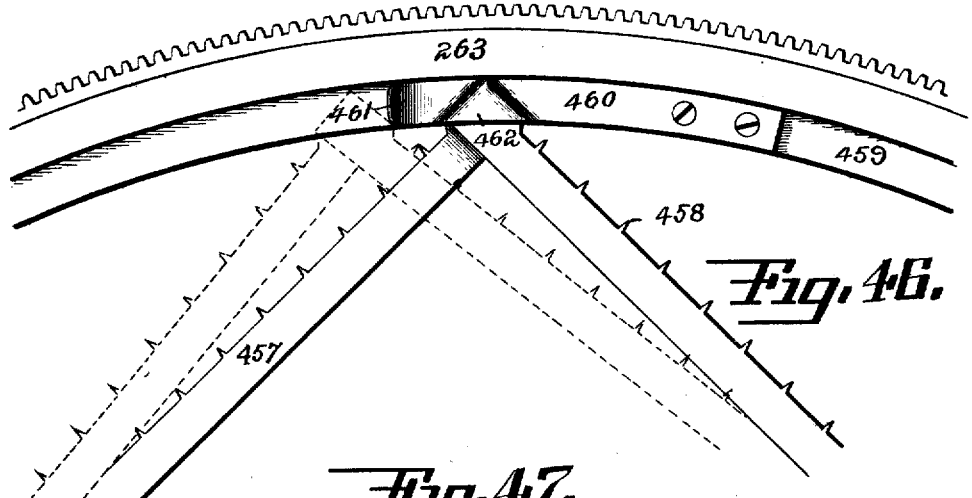
Figure 47:
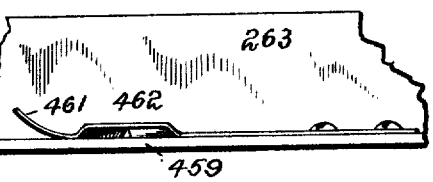

Fig. 45 is an end view showing a part of the work carrier mechanism in elevation; Fig. 46 is an enlarged view of the work carrier rack showing a corner of the work holding frame and the spring clip that holds the same in position, and Fig. 47 is a detail in connection with the spring clip; Figs. 48, 49, 50 and 51 are details in connection with the work carrier, and Figs. 52 and 53 are details in connection with the slack thread spring.

Fig. 54 is a sectional view showing details of the work carrier driving mechanism, Figs. 55 and 56 show details in connection with the work carrier driving mechanism, and Fig. 57 is a sectional view of the transmitter stud shaft.

Fig. 58 is a sectional view of the primary work carrier driving shaft showing the means for disconnecting the same from the driving shaft of the machine.

Fig. 59 is a vertical sectional view of the needle and auxiliary looper oscillating mechanism; Figs. 60 and 61 are details in connection with said mechanism.

Fig. 62 is a sectional view of the take up stud bearing.

Fig. 63 is a top plan view of the device by means of which the work carrier and work carrier cams are rotated with the cam removed, and Figs. 64 and 65 are details in connection with the same.

Fig. 66 is a full size view of the work carrier power transmission crank in position for driving the work carrier shaft, and Fig. 67 shows said crank in the position for manually adjusting the work carrier.

Fig. 68 is an end view of the machine showing the manner in which power is transmitted to the same; Fig. 69 is a sectional view of the pulleys through which the driving shaft of the machine is operated, showing means for keeping the same oiled.

Figs. 70 and 71 are details in connection with the lead of the thread from the supply to the machine.

Fig. 72 shows an illustrated design stitched on the machine, and Fig. 73 shows one form of scallop cam.

Fig. 74 is an elevation of the needle showing a guard may be used in connection with the same.

In the drawings 1 represents the arm of the machine, 2 the base, 3 the driving shaft, and 4 the hook shaft. To the rear end of the driving shaft is secured a handwheel 5 provided with friction material 6 and a hub 7, see Fig. 69. On the hub 7 is mounted a loose pulley 8, provided with a bushing 9. The loose pulley 8 has an oil guard 10, adapted to catch any surplus oil that may be thrown out or discharged from the bearing. A channel 11 serves as a means for conveying oil to the bearing between the hub 7 and the bushing 9. The bushing 9 is secured to the loose pulley 8 by means of screws 12 only one of which is shown. On the rear end of the bushing 9 is as adjustably secured by means of screws 13 only one of which is shown a cap 14 provided with a friction button 15. The pulley 8 is adapted at 16 to contact with the friction material 6, and the pulley being free on the hub 7, may be pushed into engagement with the friction material 6 in any usual manner preferably by a part contacting with the button 15 in a manner hereinafter explained. The loose pulley 8 is provided with a belt groove 17, by means of which by an ordinary belt, motion may be transmitted to the pulley for the purpose of operating the driving shaft 3 when the loose pulley 8 is pushed so that it contacts with the friction material 6. From this it will be understood that motion is transmitted to the driving shaft of the machine by a usual friction clutch. The novel feature of this mechanism is the oil guard device 10, and the special construction of the pulley 8 whereby the oil guard is provided.

The shaft 3 is mounted in usual bearings in the arm of the machine, and motion is transmitted from it to the lower shaft 4 of the machine by means of a usual chain drive 18, see Figs. 2 and 54.

To the forward end of the shaft 3, is secured a take up cam 19, which carries a crank pin 20, on which is mounted the upper end of a link 21. The lower end of the link 21 is mounted on a pin 22 which projects from a sleeve 23 that is mounted to turn on a needlebar 24, which latter is also mounted to turn in suitable bearings in the arm of the machine. The collars 25 and 26 retain the sleeve 23 in operative position on the bar 24. Just above the collar 26 on the bar 24 is secured by means of a clamping screw 27, an arm 28. The upper end of the needlebar 24 passes through a bore in a sleeve 29 provided with a flange 30 and secured in place by screw 31, having a seat in the arm of the machine, and abutting against the sleeve 29. On the lower end of the sleeve 29 is mounted to oscillate an arm 32. In the arm 32 is secured by means of a screw 33, a rod or pin 34. The rod 34 passes through above the arm 28, and is provided with an oil well 35 and suitable perforations between the same and its bearing in the arm 28, for the oil to pass through and keep the bearing properly lubricated.

To the lower end of the needle bar 24 is secured by means of clamping screw 36, a needle holder 37, which carries a needle 38. The needle may be provided with a ring 39 which performs the function of keeping the thread in the groove of the needle, when the machine is in operation.

In suitable bearings in the arm of the machine is mounted a cylindrical presser bar 40, provided with a bushing 41, at its upper end and a like bushing at its lower end not shown, see Figs. 5 and 9. These bushings serve as a bearing for an oscillating rod 42 to the upper end of which is secured by means of screw 43 an arm 44. To the lower end of the presser bar 40 is secured by means of a clamping screw 45, a presser foot holder 46 which carries a presser foot 47. The presser foot is provided with a needle aperture 48, and tube 49 through which when the machine is in operation a filling cord or material is guided under the stitching. To the lower end of the oscillating rod 42 is adjustably secured by means of clamping screw 50, the auxiliary looper carrier 51. To the looper carrier 51 is secured by means of a screw 52, a looper 53 having a nose 54 and a thread aperture 55. The presser foot is provided with a projection or thread guide 56 through which passes a thread eye 57. The looper is provided with a thread guard 58. On a suitable shouldered screw 59 is pivoted a presser bar lifter 60 which has a suitable cam part for engaging an arm 61 which projects from a part 62 that is secured to the presser bar by means of a clamping screw 63. The presser lifter 60 is provided with a flange 64 that contacts with one side of the arm 61, and said arm on its other side contacts with a bearing 65 on the arm of the machine, and by this means the presser bar is prevented from turning laterally. A spring 66 surrounds the presser bar and impinges at its upper end at 67 against the bearing through which the presser bar passes, and at its lower end against the part 62 which is clamped to the presser bar. In the operation of the presser bar it is lifted by means of the lever 60 against the action of the spring 66. It will be noticed that the flange 64 extends around the cam of the presser lifter so that the arm 61 is kept in position between the same and the bearing 65, and the presser bar thereby kept from turning laterally when it is raised or lowered.

To the shaft 3 is secured a spiral gear 68, see Fig. 59, which meshes with a spiral gear 69. The gear 69 is double the size in diameter and has double the number of teeth in it as the gear 68. It will therefore be understood in the operation of the machine, the gear 69 revolves once to two revolutions to the shaft 3 or of the gear 68.

The gear 69 is secured by means of screws 70 to a shaft 71, which in turn is mounted in suitable bearings in a bracket 72. The bracket is secured to a milled part on the top of the arm of the machine by means of screws 73, 74 and 75, see Fig. 4. Under the screws 73 and 74 are bosses not shown projecting from the bracket that contact with the arm of the machine, and passing through part 76 is a screw 77 located in a threaded seat in the said part 76.

It will be observed that the bracket 72 is provided with a 3 point bearing, the screws 73 and 74 clamp the bosses that project immediately under them from the bracket to the top of the arm of the machine, the adjustable screw 77 serves as a third bearing and also as a means for adjusting the end of the bracket through which it passes. The adjustment is secured by locating the screw 77 so that its end projects a suitable distance below the bracket to serve as a contact bearing for the same and properly locate the bracket and then the screws 75, 74 and 73 are set up so as to securely draw the 3 contact points and namely the 2 bosses and the end of the screw 77 against the bearing on the top of the arm of the machine. The function of this construction is to provide an adjustable means for bringing the spiral gear 69 into mesh with the spiral gear 68.

In suitable bearing in the bracket 72, is secured by means of a screw 78 bushing 79 in which is mounted to oscillate a short shaft 80 having on its inner end a retaining collar 81, and having secured to its outer end by means of a screw 82, an arm 83. From the rear end of the shaft 71 projects a crank pin 84 on which is pivoted a shoe 85 which is located in a way 86 formed in the rear side of the arm 83. In the face of the arm 83 is a T slot way 87, in which a suitable bearing is adjustably secured by means of a thumb screw 88, to serve as a pivot for the end of a pitman and on which the free end of the part 89 of a two part pitman is pivoted.

In the arm 44 is secured a pin 90 provided with a ball bearing 91, which is suitably embraced by a head 92, which in turn is secured to a rod 93 that is adjustably clamped to the part 89, as is shown in Fig. 4.

To the rear end of the shaft 71 is secured by means of screws 94, a cam 95. To the rear end of a lever 96 is secured an antifriction roller 97 which contacts with the cam 95. The lever is pivoted on a stud 98, which in turn is secured to an arm 99, extending from the bracket 72. A suitable spring which surrounds the hub of the lever 96, impinges at 100 against the upper side of the arm 99, and at 101 against the lever 96, so as to hold the friction roller 97 in contact with the cam 95.

To the upper end of the presser bar 40 is adjustably secured by means of a screw 102, a collar 103. The free end of the lever 96 is located so that it contacts with the under side of said collar, see Fig. 5.

To the reduced end 104 of the shaft 71 is secured by means of a screw 105 a cam 106, which is embraced by a fork 107 that is secured at 108 to the end of a short shaft 109, which latter in turn is suitably mounted to oscillate in a bearing in the bracket 72, see Figs. 2, 4 and 59. The fork 107 is in the shape of a bell crank lever and in the arm 110 of the same is a way 111 in which the rear end of a needle bar pitman 112 is adjustably secured. The forward end of the pitman embraces a ball carried by the needle bar oscillating arm 33, the pitman is made in two parts which are adjustably clamped together as shown at 113 in Fig. 4.

It will now be understood when the machine is operated the auxiliary looper 53 will be operated through the action of the eccentric pin 84, and that the needle bar will be oscillated about its vertical axis by the action of the cam 106, and through this oscillation the needle 38 will be oscillated laterally.

To the under side of the bed of the machine is secured a bracket 114, in which is located in suitable bearings the forward end of the hook shaft 4 of the machine. To the outer end of this shaft is secured a bevel gear 115, which meshes with a bevel gear 116, secured to the under side of a head 117, of a short shaft 118, which latter is mounted to turn in the bracket 114. The gear 116 is one half the diameter of the gear 115 therefore it will be understood that the gear 116 revolves twice to each revolution of the gear 115. The head 117 carries a hook 119 provided with a bobbin case 120 which latter carries an auxiliary hook 121.

To the shaft 4 is secured a cam 122 which engages a friction roller 123 carried by the rear end of an arm 124. The arm 124 in turn is mounted to oscillate on a stud shaft 125, constructed as shown in Fig. 26. A reduced portion 126 is secured by means of a screw 127 in a detachable bracket 128, which latter is secured to a bracket 114, by means of screws 129. The bracket 128 is provided with a downwardly projecting tail 130 to which is secured the lower end of a spring 131, the upper end of said spring being secured to the arm 124, see Figs. 24 and 25. The arm 124 is provided with a projection 132 which carries a pin 133 that engages on the under side of a bobbin controller finger 134, which latter is mounted on a reduced bearing 135 formed on the arm 124, as shown in Fig. 26. One end of a spring 136, at 137 engages the bobbin controller arm 134, and the other end of said spring passes into a hole in the enlarged head 138 of the stud shaft 125.

A part 139 of the stud shaft 125 is enlarged and it is about this part that the spring 136 is mounted. On the middle portion of the stud shaft 125 and next to the part 139 is a washer 140. This washer in conjunction with the head 138, keeps the body of the spring 136 properly located, and also serves to keep the pivot of the lever 134 properly located, and separated from the spring.

In the outer end of the lever 134, and on the under side of the same is formed a boss 141, adapted to engage a bobbin 142 carried by the bobbin case.

The means provided for the take up mechanism consists of a tapered cam groove 143 in the cam 19. A take up lever 144 pivoted on a part 145, on a specially constructed adjustable bearing which is threaded and located in a threaded seat in the arm 1, as shown in Fig. 62. This bearing consists of a sleeve having the part 145, a flange 146, a threaded portion 147, and a lock nut 148. Through the sleeve passes a stud 149 provided with a head 150 which serves to retain the take up on the bearing 145. The pin 149 is threaded at its outer end and is held rigidly in position by the lock nut 151. The lever 144 is provided at its cam end with a pin 152, on which is mounted a roller 153, and at its outer end with a thread eye 154.

The cam groove 143 is cut so that the tapered roller fits the same, or enters the same, to the same extent, no matter what the position the take up may be in. So to have a good fit between the cam groove and the roller it is only necessary to properly adjust the bearing for the take up by the means that has just been described, and then lock it in position by the lock nut 148.

In Fig. 22 I have shown a modification of the cam roller and the pin of which it is mounted.

155 and 156 are thread guides provided with eyes as shown in Fig. 4 for suitably guiding the thread to a tension or controller device 157 and 158, see Figs. 2 and 4. From the tension device the thread runs to the slack thread device 159, from there to take up eye 154 of the take up, thence to an eye 160 and 161 formed in a thread guide 162, located and secured in a bearing by a screw 163 as shown in Fig. 2; from the eye 161 the thread runs through an eye 164 and thence to the eye of the needle.

165 is a similar thread guide through which passes the auxiliary looper thread to a tension device 166, and thence to the thread eye 57 and from there to the thread eye 55 in the auxiliary looper. 168 is a guide through which the filling cord or material passes, and from there it goes to an eye 169, in a suitable guide, and then it passes to and through the tube 149 in the presser foot.

The tension device for the auxiliary looper thread is constructed as follows, 170 is a stud secured at 171 in the arm of the machine as shown in Fig. 18. On the said stud is a flange 172 in which there is a groove 173; on this flange by means of a screw 174 is adjustably mounted a barrel 175, having a cut out portion 176. In the barrel is located a slack thread spring 177 provided with a looped end 178 which projects through the opening 176, and loops over tension disks 179 and 180.

The slack thread spring 177 has a turned in end 181 that is located in a groove 182, in the stud 170. The other end of the spring 177 impinges against the abutment 183 as shown in Fig. 18. A washer 184 serves to properly keep the spring in its housing and separate from the tension disk 179. A washer 185, a tension spring 186, and a tension adjustable nut 187, serve in a usual and well known manner to press the disk 180 toward the disk 179 and thereby produce tension on the thread.

In Figs. 52 and 53 I have shown a usual form of slack thread take up spring device, and thread guide which is usually intermediate the tension and take up. This device as I show it however is different from the usual device in the following particulars: On a bearing 188 is adjustably located by means of a screw 189 a collar 190 which carries a pin 191. This pin 191 serves as an adjustable stop for the slack thread spring 192. This spring is engaged by the thread as the take-up moves to the completion of its stroke in a usual and well known manner.

I have provided a table especially adapted to carry the mechanism of my machine. It, like all the other parts of my machine, is made of metal. Therefore there is no inflammable material in connection with any part of my machine. The table is provided with 3 legs so that it does not call for an even floor, and it, in connection with the rest of the mechanism, is especially adapted to be run as a unit by individual motor from which power may be transmitted to the machine in any usual form.

193 is the table of the machine, and 194 the planed surface of the same on which the mechanism is mounted, see Fig. 31. 195 is the aperture in which the base of the machine is located, and 196 are bosses against which the flange of the bed rests to insure its proper location, relative to the work moving mechanism of the machine. 197 and 198 are holes through which the belt runs from the transmitter or from the motor to the machine.

199, 200 and 201 are three tracks provided with grooves 202 as shown in Figs. 31 and 35. 203 are apertures in the table for lightening the weight of the same. The table is provided with legs 204, 205 and 206, suitably secured to the table by means of screws not shown.

207 is the main work carrier shaft which is suitably mounted in brackets 208 and 209 secured to the table of the machine, as shown in Fig. 1. This main work carrier shaft is driven by the following mechanism: On the upper shaft of the machine is secured by means of a screw 210 a small worm 211, which meshes with a large worm wheel 212 as shown in Fig. 2.

On the rear end of the shaft 207 is mounted a bushing 213 in which the shaft can turn freely, shown in dotted lines in Fig. 55. On the outside of said bushing is mounted and clamped by means of clamping screws 214 a bracket 215. In the end 216 of said bracket is a bushing 217 which is clamped by means of a clamping screw 218 in said end.

On the main work carrier shaft 207 is secured a bevel gear 219 which meshes with a bevel gear 220, the latter being secure to the free end of a primary work carrier shaft 221, which passes through and turns freely in the bushing 217. A collar 222 secured to the shaft 221, abuts against the bushing 217 and the hub of the bevel gear 220 abuts against the other end of the bushing 217, and thereby the shaft is retained in its proper position in its bearing.

It will now be seen that the free end of the shaft 221 may be moved up and down without in any way interfering with the meshing of the gears 220 and 219. A lower cover 223 is connected by screws not shown to the bracket 215, and an upper cover 227 is connected by screws 225 and 226 to the lower cover thus making a complete housing for the gears 219 and 220.

A bracket 230 is secured to the table of the machine by screws 231. In the upper end of this bracket is formed a way 232 in which is secured an adjustable bearing 233, by means of a washer 234 and a lock bolt 235, as shown in Figs. 54 and 58. On the outer end of the shaft 221 is mounted to turn freely the worm wheel 212. This worm wheel is provided with a hub 236 and a flange 237, having holes in it 238, see Figs. 2 and 54. A locating collar 239 is secured to the shaft 221, and serves to retain the worm wheel from moving out of its position in the direction of its collar.

The shaft 221 in its outer end is provided with a bore 240 in which is located a plunger having an enlarged portion 241, to the inner reduced end 242 of which is secured by means of a screw 243 a collar 244. The collar and the other end of the plunger fits the bore. On the reduced portion 242 is mounted freely a collar 245, which is restrained from movement by means of set screws 246, located in the bore, as shown in Fig. 58. A coil spring 247 impinges against a collar 244 and the collar 245.

To the outer end of the enlarged portion of the plunger is secured by means of screws 248 an arm 249, provided with a pin 250 and a handle 251. In the outer end of the wall of the bore 240 is a cam lock 252. The cam lock has cam portions 254 and 255 and locking portion 256 in which is located a pin 253 projecting from the enlarged portion 241 of the plunger.

It will now be understood in connection with the foregoing mechanism that the spring 247, which impinges against the collar 245, which is immovable, and the collar 244, which is attached to the plunger, which latter is movable, that the spring will normally hold the enlarged portion 241 of the plunger against the fixed collar 245, in which position the pin 250 will be located in one of the holes 238, of the flange 237, as shown in Fig. 58.

When these parts are in this position a pin 253 will be located in the cam lock 252, in position shown in Fig. 66 and in this position the parts are locked to the worm wheel 212. Therefore when the machine is operated the worm wheel will transmit rotary movement to the shaft 221. Now if it is desired to disconnect the shaft 221 from the worm wheel for the purpose of reversing or turning free of the worm wheel, the shaft and through it the mechanism operated by it, the operator by means of the handle 251, draws out the plunger against the action of the spring 247 and thereby disconnects the pin 250 from the hole 238 as shown in dotted lines in Fig. 58.

When the parts are in this position the pin 253 is in the cam lock portion 254, as shown in Fig. 67, provided the operator is turning the handle to the right. But if the operator is turning the handle to the left, then the pin 254 will be in the cam portion 255. These cam portions perform the function of holding the plunger and through it the pin 250 out of engagement with the holes 238. These holes 238 are equally spaced, and represent a predetermined number of stitches, made by the machine during the turning of the pin 250 from one to another of said holes. This constitutes the turning device, which serves to insure proper relation of parts and movements, which will be more fully described in the description of the workings of the machine.

257 (Figs. 1 and 32) is the work carrier frame which is provided with attached tracks 258, having ball grooves as shown in Fig. 33. When the work carrier is in position these tracks 258 are the upper members of the tracks 200, and intermediate these tracks are balls, one of which is shown in Fig. 33. To bracket 259, attached to the rear end of the work carrier frame, is a ball bearing wheel 260 which is located to roll in the groove 202 of the track 199. The construction of the ball bearing wheel 260 will be understood by referring to Fig. 35. In the work carrier frame 257 is mounted a work carrier rack 261 in which is formed a groove 262 and on which is formed a toothed flange 263, that is covered by the work carrier frame 257, as shown in Fig. 34. Ball bearing wheels 264, 265 and 266 are attached to the work carrier frame in the manner shown in Fig. 34.

In the part 267 of the work carrier frame are ways 268 and 269, in which are located bearings 270. Each of these bearings are provided with two upwardly extending legs 271, see Figs. 37 and 63. On the top of these legs, by means of screws 272 is secured a ring 273. A worm wheel 274 has an upwardly extending flange 275 which has its peripheral bearing in the ring, a cap ring 276, which is attached by screws 277 to the flange of the gear serves to retain the gear in its bearing in the ring 273.

Passing through a bore 278 in the work carrier is a bushing 279 which is secured to the work carrier by screws 280. In this bushing is located a shaft 281, which has a flange on its lower end 282, to which is secured a gear wheel 283, by means of screws 284, as best shown in Fig. 37. To the upper end of the shaft 281 is secured by means of a screw 285, an arm 286, provided with a way 287, see Figs. 37 and 65. The top of the shaft 281, is provided with key 288 that fits in the groove 289 of the arm 286. A shoe 290 is suitably carried by the worm gear 274, as shown in Fig. 37. When the parts are in position this shoe is located in the way 287, of the arm 286. A plug 291, is secured to the worm gear 274, by means of screws 292; this plug carries a pin 293, which projects into a hole 294 formed in a cam 295 which is located on a reduced hub of the plug 291. A screw 296 holds the cam in position as shown in said figure. In the cam 295 is formed a cam groove 297.

The center of the gear 274 is located eccentric to the center of the shaft 281, therefore, it will be understood that the rotation of the gear 274 through its connection by the means of the shoe 290 in the way 287, will produce a differential movement to the shaft 281, and through it, the mechanism operated by it.

The rack 261 is four times the size of the gear 283, so the gear 283 revolves four times to one revolution of the rack, consequently the differential movement takes place four times to each revolution of the rack.

On the bed of the machine is suitably secured a bracket 298, see Fig. 38; in the end 299 of this bracket is pivoted a lever 300 the fulcrum of which is constructed as follows, see Fig. 49: On the under side of the lever 360 at the fulcrum a boss 301 is formed, to which is secured by means of screws 302 a pivot shaft 303, constructed as shown in Fig. 49. In the end 299 of the bracket is secured by means of a set screw 304 a bushing 305 in which the shaft 303 is mounted and free to turn. A collar 306, secured to the lower end of this shaft serves as a means for holding the shaft and through it the lever in position.

In the outer end of the lever, see Fig. 37, is secured by means of a thumb nut 307, a pin 308 having a head 309 pinned to it, and a roller 310 carried by its lower end, which roller is located in the cam path 299. The lever 300 is provided with a T slot 311, in which is located a slide 312; the slide is provided with a thumb screw 313, which serves as a stop and also as a means for pushing manually the slide to a desired position. A threaded hole 314 is provided to which the thumb nut 313 may be transferred. The lever is provided with a slot 315, shown in dotted lines in Fig. 38. A thumb nut 316 passes laterally and freely through the part 317 of the lever and has a threaded seat in the part 318. From this it will be understood that the thumb nut 316 performs the function of rigidly clamping the slide 312 in position in the T slot 311.

A stop block 319 is located in the T slot, and may be adjustably secured in any position along the same by means of a screw 320, which passes through a threaded bore in the block and butts against the bottom of the T slot. An additional adjustable stop is provided which consists of a part 321, see Figs. 38 and 45, having a slot 322 in it through which a screw 323 passes, and adjustably secures it in position. The stop finger 324 projects over the slide 312. It will now be understood that the thumb nut 316 may be loosened and the slide 312 may be pushed along until the end of the slide butts the adjustable slide 319, or it may be pushed in the opposite direction until the thumb nut 313 abuts the stop finger 324. At 325 in the bracket 298, is pivoted a lever 326 which has a fulcrum which is constructed as follows: In the under side of the lever is secured a pivot shaft 327, see Fig. 50. This shaft is located in a bushing 328, which bushing in turn is secured by means of a set screw 329 in the bracket 298. A disk 330 is rigidly secured by means of a screw 331, to the lower end of the shaft 327, so as to hold the shaft into position and permit it to turn freely in the bearings. A coil spring 332 surrounds the bushing 328. One end of the coil spring at 333 impinges against the bracket 298, and the other end at 334 is located in a hole in the disk 330.

The lever 326 has a slot in it 335, (see Fig. 42) in which is located a shoe 336. In the end of the slide 312 is located a pin 337, provided with a flange 338, and an eccentric crank pin 339 and a lock nut 340. It will be understood from this construction that the lock nut may be loosened, and the pin 337 turned around to different positions that may be desired, and that this will adjust the end of the slide laterally relative to the slot 315 in the lever 326.

On the hub 341 is adjustably clamped by means of a screw 342, a part 343, provided with a handle 344, (see Figs. 41 and 50). A catch 345 is provided with an incline 346 and a notch 347, (see Fig. 45). The arm 344 is made thin and is adapted to spring, so that when it is pushed around it will ride upon the incline 346 and spring into the notch 347, in which position it is shown in Fig. 41. The part 348 extends upwardly and prevents the handle 344 from passing beyond the notch, and thereby insures its spring into the notch when it is pushed against the abutment 348.

In an extending part 349 of the bracket 298, is secured by means of a set screw 350, a bushing 351, in which is located the hub 352 of the bevel gear 353, (see Fig. 48): a cap 354 is secured by means of screws 355 one only of which is shown, to the top of the hub of the gear, thereby retaining the gear in said bushing as shown in said figure. On an upwardly extending hub 356 of the cap 354, is located a cam 357, which is held from turning by a dowel pin 358, that is carried by the cap 354. This dowel pin projects into a hole in the cam. A thumb nut 359 holds the cam on its seat. It will be observed by this construction that the cam may be very readily removed or secured in place. To the end of the main work carrier shaft 207 is secured a bevel gear 360 that meshes with the bevel gear 353. The relative size of these gears is 4 to 1. In the outer end of the lever 326 at 361 is a roller pin projecting downwardly that carries a roller that normally contacts with the cam 357 through the action of the spring 332.

In a bracket 362 secured to the work carrier, and a bracket 363 secured to the part 270, is mounted a shaft 364, which carries at its rear end a worm gear 365 that meshes with the worm wheel 274, and at its forward end a bevel gear 366, which latter meshes with a sliding bevel gear 367 that slides on the shaft 207.

The means by which the gear 367 is constructed to slide, and caused to slide on the shaft 207 when the machine is in operation, are as follows: In the shaft 207 are ways 368 and 369. The gear 367 carries pins 370, 371, 372 and 373, held in position by set screws as shown in Fig. 39. These pins have heads 374 to facilitate their removal from their seat. The pins 370 and 371 carry rollers which are located in the groove 368, while the pins 372 and 373 carry rollers which are located in the groove 369, which groove is diametrically opposite to the groove 368. The work carrier frame 257 carries a bracket 375 provided with a pin 376, and carries a roller 377 that is located in a groove 378 formed in the hub of the gear 367, (see Fig. 39). It will be observed that this construction will cause the gear 367 to slide in unison with the movement of the work carrier and thereby keep the gears 366 and 367 in mesh with each other. Covers 379 and 380 are provided for covering the gears 366 and 367. The cover 379 is secured to the work carrier frame by means of a screw 381 as shown in dotted lines in Fig. 39, and cover 380 is secured by screws 382 and 383 to cover 379.

To a downwardly projecting flange of the under side of the table is secured by means of screws 384, one only of which is shown, a bracket 385, in a bearing 386 in which is located a shaft 387, having an oil receptacle in it 388, as shown in Figs. 54 and 57. A pulley 389 located on the inner end of the shaft serves as means for transmitting movement from a suitable source to the shaft 387, and pulley 390 secured to the other end of said shaft serves as means for transmitting power to the machine. The shaft 387 has a hole in its end 391 which serves as means for conveying oil to the oil well. The holes 392 serve as means for permitting the oil flow to the bearing between the shaft and the bracket. The bearing for the shaft is of such an extent that the ends of the shaft just project enough for securing the pulleys to the same, so it will be understood that the pulleys by abutting against the ends of the bearing keep the shaft and pulleys in operative position.

I use a usual form of thread stand for carrying the supply of thread and filling material; this consists of a bracket as is shown in Fig. 1. However I have provided this usual form of bracket for holding the thread with unwinders which are constructed as follows: Rods 393, see Figs. 1 and 70, are properly secured in the bracket by usual means, and pass up through the center of the spool or cone on which the thread is wound. These rods 393 have a bore 394 and are slotted as shown at 395, see Fig. 70. A button having a head 396, and a stem 397, is pressed into bore 394. The slot 395 serving the function of causing the walls of the bore to clamp the part 397 of the button and hold it in place. The bore 398 passes through the button and down through this bore passes an end 399 of an unwinder, which end is turned as shown at 400, for the purpose of retaining the unwinder in the bore. The unwinder has the usual lateral extension 401, and is provided with the usual eye 402 for the passage of the thread.

In a machine of the character described it is advantageous to have an efficient stop motion, with a very wide range of action. I have constructed a special form of stop motion which meets these requirements. This stop motion is also especially adapted for use as an important element in the complete combination of mechanisms of my machine. To the rear end of the shaft 207 is secured an eccentric 403 on which is mounted a gear wheel 404. The eccentric is secured to the shaft 207 by means of a screw 405, and the eccentric is free to turn within the bearing between it and the gear. The bracket 208 is provided with a flange 406 and ears 407 and 408 which will be understood by referring to Fig. 13. In the ears are located tooth segments 409 and 410. The teeth of the gear wheel alternately engage the teeth of the segments as the shaft 207 revolves and the eccentricity of the eccentric is of such an extent that this engagement causes the gear wheel 404 to advance one tooth to each revolution of the shaft 207.

The gear 404 carries a pin 411 which is adapted to engage the end of a lever 412. A cover 413 is provided for the stop motion gear 404, which serves in combination with the flange 406 to provide a complete housing for the gear as will be understood by referring to Fig. 15.

The lever 412 is pivoted on a bearing 414, and is secured by a lock nut 415, to the end of a latch slide 416, the other end of said latch is secured to the lower end 417, of a clutch lever 418. This clutch lever is suitably pivoted at 419, see Fig. 13, on a bearing which latter is suitably secured in the upright portion of the arm of the machine. The clutch lever 413 is provided with an arm 420 which carries friction material 421, adapted to engage the periphery of the hand wheel 5. This clutch lever is also provided with a head 422, which on its inner face has a cam 423, see Fig. 2, that is adapted to engage the button 15 and thereby press the pulley 8 into engagement with the friction material 6, and cause the machine to be driven when power is transmitted to the pulley.

A spring 424 is mounted on the bearing 415, the end 425 impinges under the lever 412, and the end 426 under the latch slide 416, thereby normally tending to turn the lever 412 in a direction to cause its outer end 427 to move upwardly. The other end 428, see Fig. 43, of the lever, engages the end 429, of a spring 430, which is secured at 431 to the slide 416. The spring 430 impinges against a stop 432 and is of sufficient strength, above the strength of the spring 424, to normally remain against said stop, as shown in Fig. 43. A catch lever 433 is pivoted at 434, on an upwardly projecting part 435 of a bracket 436 which is secured to the bed of the machine, see Figs. 3 and 17. A groove 437 is formed in the upper edge of the catch in which is located the free end of a flat spring 438 secured by means of a screw 439 to the top of the part 436 of the bracket. The catch is normally located in a notch 440 in the latch slide, which latter carries a block 441, which extends upwardly on one side of the latch 433, and a part 434 extends a greater extent on the other side of the catch as will be understood by referring to Fig. 43. The latch slide 416 is located in a way 442 formed in an upwardly extending part of the bracket 436 and is held from being lifted out of the way by the head of a screw 443, which latter does not clamp the slide but only prevents it from being moved out of its bearing.

To the lower end of the clutch lever 418, Fig. 13, is a knob 444 to which is secured one end of a spring 445, and at its other end is connected to a bolt 446. The bolt 446, see Fig. 54, passes through a small bracket 447, which is secured to the bed of the machine. A thumb nut 448 serves to lock the bolt 446 in position.

At 449 is suitably pivoted on the arm of the machine, see Fig. 3, a thread trip lever 450, the lower end of which is provided with a toe, not shown, that projects under catch lever 433. The lower end of said lever normally rests against an adjustable stop pin 451. The upper end of the lever is provided with a head 452 in which is secured a part 453 having eyes 454, 455 and 456.

A frame 457, is provided with pins 458 for holding the material in a usual way. On the interior flange 459 of the work carrier rack, see Figs. 46 and 47, is secured spring clips 460, located so as to engage the corners of the frame 457, as will be understood by referring to Fig. 1. The clip is provided with an upwardly extending end 461, and a pocket 462. In inserting the frame in position the corners are placed on the flange 459, and then the frame is turned around until its corners reach the pockets 462, which pockets by reason of the spring action will hold the frame in position.

In Fig. 51 I have shown the means by which a peripheral cam may be used in my machine, in place of the closed cam that has been described. When it is desired to use a peripheral cam a pin 463 is secured in the mean center of the cam action, and a spring 464, is at one end connected to the pin 463, and at the other end to an eye 465, attached in any suitable manner to the end of the lever 300.

In the operation of the machine, by the action of the cam path 297, and the rotation of the work carrier by the means that has been described, the general outline path 466 illustrated in Fig. 77, will be embroidered, provided the lever 326 is adjusted out of action as is shown in Fig. 41. Now if the lever is adjusted in action as shown in the position it is in in Fig. 38, the general outline 467 will be embroidered. And if the auxiliary looper 53 is in action a purl edge 468 will be simultaneously produced along the outer edge of the embroidered path. The square cam 357 produces the movements which produces the scallops 467, and the path cam 297 simultaneously therewith produces the general outline shown embroidered in Fig. 72. By changing the shapes of these cams, the embroidered pattern may be indefinitely varied.

The differential movement described in connection with the mechanism shown in Fig. 37, is for the purpose of properly spacing the stitches along the side of a square figure, such as is shown in Fig. 72. This differential motion is so timed that as the stitching approaches the corner of the square figure, or as it moves away from the center of the carrier, the speed of rotation is decreased and vice versa.

When it is desired to stitch round figures, the parts are located so that the center of the worm wheel 274 is concentric with the center of the shaft 281. When the parts are in this position a uniform rotary movement is transmitted to the work carrier.

Further in connection with the operation of the machine it will be noted that the looper 53, moves laterally in the same direction that the needle move laterally and a greater extent. For example, when the looper moves to the right, it moves to the position shown in Fig. 7, when it moves to the left it moves to the position shown in Fig. 8, each of which positions are outside of the lateral operative positions of the needle. It will be observed that the looper is shown much more to the right of the lateral movement of the needle than it is to the left in Fig. 8. This is for the purpose of drawing the auxiliary thread to the outer edge of the embroidered path. The nose 54 of the looper moves in a path back of the reciprocating paths of the needle and the auxiliary thread is delivered from the extreme end of the nose so it will be understood when the looper moves to the left it passes the looper thread over the needle thread and back under the needle, and when the looper moves to the right it again passes the looper thread over the needle thread and back of the needle, and that therefore the looper thread is consecutively looped around the links of needle thread running from one to another of the stitches. The operation of the looper further to the right, than to the left of the needle as will be understood from Figs. 7 and 8, draws the auxiliary thread which is twisted around links of the needle thread to the edge of the embroidered path, thereby making a buttonhole finish along said edge.

It will be further understood that when the looper is moved to the position shown in Fig. 7, the buttonhole stitch is being set, and the part 178 of the slack thread spring for the auxiliary thread is moved in a direction to increase the tension of the spring, thereby making a yielding setting of the buttonhole stitch, as the supply of auxiliary thread is being drawn for a successive stitch. And when the looper moves to the position shown in Fig. 8, the part 178 moves back to its normal position, and as the eye 57 of the guide 56 is to the left of the zone of action of the looper, it will be seen that when the looper moves to this position it gives slack thread. The action of the part 178 of the auxiliary thread slack spring is properly adjusted by the barrel 175 which latter is secured in position by screw 174, see Figs. 18 and 20, to just take up the slack of the auxiliary thread when the looper moves to the position shown in Fig. 8. It will be understood that these parts are so adjusted that no drag is produced on the auxiliary thread when the looper moves to the said position, and that all of the drag or pull on the looper thread is when the looper moves to the position shown in Fig. 7.

When the thread breaks, or the supply of bobbin thread runs out, or for any reason the machine omits stitching for any distance, the work carrier may be reversed and the stitching again started at or about the point where the stitching stopped. For example, suppose the bobbin thread runs out when the stitching has proceeded one half the distance around the piece being stitched, and the machine runs so that the work carrier is moved one sixth of a complete revolution, before the operator notices that the machine is not stitching. In this event the operator moves the work from the machine, inserts a new bobbin of thread replaces the work and then pulls outwardly on the handle 251, and at the same time turns by the said handle the shaft 221, until the work carrier has been reversed to a position where the needle will commence to stitch on the top of the last stitches made before the bobbin run out. In this connection it will be observed that the pulling of the handle 251 disconnects the shaft 221, from the worm wheel 212, so that when this shaft is turned manually as described all of the work moving mechanism as well as the stop motion are turned, so no part of the mechanism is put of time when the work carrier is turned separately from the stitch forming mechanism, as just described. The holes 238, in the flange of the worm wheel are predetermined number of stitches apart, that is, in the turning of the worm wheel from one to another of these holes, the needle moves laterally a predetermined number of times. Therefore it will be understood that in disconnecting the work moving mechanism from the stitching mechanism it is not put out of time even as to lateral movements of the needle, as when the pin 250 enters any of the holes, it is coincident with the predetermined lateral movement of the needle in a predetermined lateral direction.

The gear wheel 404 is provided with suitable number of teeth so that in the operation of the machine, the work carrier rack 261, and through it the work carrier is revolved a sufficient extent over once around to make a predetermined number of stitches on top of the beginning stitches of the design before the machine has stopped, thereby thoroughly tacking the stitches at the beginning and the finishing of the design.

Having now described my invention what I claim as new is:—

1. In a machine. a stitch forming mechanism comprising a vertically reciprocating and laterally vibrating needle, a work moving mechanism provided with means for holding a piece of material or fabric in an extended position, means for producing a relative lateral movement between the laterally vibrating needle and the work moving mechanism, a thread carrying looper, and means for operating said looper to loop its thread around links of the needle thread.

2. In a stitching machine having a rotating shaft and a vertically reciprocating needle, a work carrier frame adapted to reciprocate, a work carrier adapted to revolve mounted on the frame, mechanism adapted to reciprocate the frame and rotate the work carrier, and gear connections only for transmitting movement from the rotating shaft to the operating parts of said mechanism, all said actuating mechanism being continuously positively connected during the operation of the machine.

3. In a stitching machine having a rotating shaft and a vertically reciprocating and laterally vibrating needle, a work carrier frame adapted to reciprocate in the same direction in which the needle vibrates laterally, a work carrier adapted to revolve mounted on the frame, mechanism adapted to reciprocate the frame and rotate the work carrier, and gear connections only for transmitting movement from the rotating shaft to the operating parts of said mechanism, all said actuating mechanism being continuously positively connected during the operation of the machine.

4. In a stitching machine, a work carrier adapted to rotate, a revolving shaft that is mounted separately from said work carrier, a gear mounted on said shaft which turns with the shaft, means whereby said gear is adapted to slide longitudinally on the shaft, and a connection between the gear and the work carrier whereby the work carrier is revolved by the gear.

5. In a stitching machine, a vertically reciprocating needle, a work carrier frame, means whereby said work carrier frame is reciprocated, a work carrier mounted and adapted to revolve on said frame, a revolving shaft, a gear mounted on said shaft, a connection between said gear and the shaft whereby the gear revolves with the shaft, means whereby the gear is adapted to slide longitudinally of the shaft, a connection between the gear and the work carrier whereby the work carrier is revolved from the movement of the gear, and a connection between the gear and the work carrier frame whereby the gear is reciprocated longitudinally of the shaft by the reciprocating movements of the frame.

6. In a stitching machine, a stitching mechanism, means for operating the stitching mechanism comprising a revolving shaft, a work carrier mechanism comprising a revolving work carrier, a connection between the said revolving shaft and the work carrier whereby the work carrier is revolved from the movement of the shaft, and means for manually detaching said connection from said shaft without detaching any part from the machine.

7. In a stitching machine comprising a revolving shaft, a worm attached to said shaft, a worm wheel in engagement with said worm, a work carrier, means intermediate said worm wheel and said work carrier whereby the work carrier is operated from the movement of the worm wheel, and a device whereby said means may be disconnected from the action of said worm wheel.

8. In a stitching machine, a reciprocating needle, a work carrier frame, means for moving the work carrier frame laterally comprising a worm wheel mounted on the work carrier frame, a revolving shaft mounted in bearings separate from the work carrier frame, a gear mounted on said shaft and adapted to slide longitudinally of the same, a connection between said gear and the work carrier frame whereby the gear is moved longitudinally of the shaft, a work carrier rack adapted to revolve on the work carrier frame, a connection between the said work carrier rack and the worm wheel, and a connection between the said worm wheel and the said gear.

9. A stitching machine comprising a hook operating shaft, a needle operation shaft, a gear carried by one of said shafts, a work carrier frame adapted to reciprocate, a work carrier mounted on said frame adapted to rotate, a work operating mechanism shaft adapted to rotate, means whereby when the work operating mechanism shaft is rotated the work carrier frame is reciprocated and the work carrier is rotated, a connection between the work operating mechanism shaft and the gear, a stop motion device, and means whereby the stop motion device is operated from the movement of the work operating mechanism shaft.

10. In a stitching machine, a work moving mechanism comprising a work carrier, means whereby when the machine is operated the work carrier is revolved continuously in a given direction, a stop motion device, and means whereby when the movement of the work carrier is reversed the movement of the stop motion device is also reversed.

11. In a stitching machine, a work carrier frame, a bearing separate from said work carrier frame, means for reciprocating the work carrier frame comprising a lever mounted to oscillate in said bearing, an operating cam mounted on the frame, said lever in engagement with said cam, a second lever in engagement with the first lever, a second bearing separate from the work carrier frame, an operating cam mounted in said second bearing, and said second lever in engagement with the last mentioned cam.

12. In a stitching machine, a work moving mechanism comprising an annular toothed rack, said rack provided with an inwardly extending flange, a square frame for holding the material, and spring clips located on said flange for holding said frame in position.

13. In a sewing machine, a work carrier mechanism comprising a work carrier operating shaft, a work carrier frame, a revolving work carrier mounted on said frame, means for revolving the work carrier mounted on the frame, a connection between said means and the work carrier operating shaft, a cam operated by said means, a lever mounted separate from said frame one end of which is in engagement with said cam, a second lever in engagement with said first lever, and means whereby said second lever is operated from the movement of the work carrier shaft.

14. In a stitching machine, a work carrier mechanism comprising a carriage or frame, an operating cam carried by said work carrier, a lever pivoted intermediate its ends, one end of said lever in engagement with said cam, a slot or way in said lever, a bar adapted to slide in said slot, means for adjustably securing the bar in the slot, a second lever pivoted intermediate its ends, a way formed in said second lever, a part carried by the bar that projects into the way in the second lever, and an operating cam which is in engagement with the second lever.

15. In a stitching machine, stitch forming operating mechanism, work moving mechanism comprising a revolving work carrier, means intermediate the stitch forming operating mechanism and the work moving mechanism comprising a revolving shaft for transmitting power to the work moving mechanism, and means for disconnecting said shaft from the stitch forming operating mechanism that drives it so it may be revolved separately from said stitch forming operating mechanism.

16. In a sewing machine, a stitching mechanism comprising a revolving shaft, a work carrier mechanism comprising a shaft that is located longitudinally parallel with said stitching mechanism shaft, a gear carried by said stitching mechanism shaft, and a connection between said gear and the work carrier shaft whereby the work carrier shaft is revolved, a work carrier and a connection between said work carrier and the work carrier shaft whereby the work carrier is revolved continuously in a given direction.

17. In a stitching machine, a work operating mechanism comprising a rotating and reciprocating work carrier, a stop motion device comprising a toothed wheel, two parts provided with teeth, each of said parts located on opposite sides of the toothed wheel, the toothed wheel located and operated so its teeth alternately engage the teeth of first one and then the other of the parts, means for reversing the moving of the work operating mechanism, and means whereby when the movement of the work operating mechanism is reversed the work carrier and stop motion device are reversed.

18. In a stitching machine, a vertically reciprocating and laterally vibrating needle, a work moving mechanism comprising a reciprocating and rotating work carrier, an auxiliary thread carrying looper, means for operating said looper so that it loops its auxiliary thread around links of the needle thread, a tension device for the auxiliary thread, and a spring take-up which the auxiliary thread engages when the stitch supply of auxiliary thread is being drawn.

19. In a stitching machine, a stitching mechanism, a work moving mechanism, a stop motion mechanism, said stop motion mechanism comprising a toothed wheel, two parts each of which have one or more teeth, each of said parts located on opposite sides of the toothed wheel, the toothed wheel mounted on an eccentric, said eccentric being located and constructed so that when the eccentric is revolved the said toothed wheel engages alternately the tooth or teeth of said parts, and means whereby the said stop motion device is operated from the movement of the work carrier mechanism.

In testimony whereof I have signed my name in the presence of two subscribing witnesses.

WILLIAM N. PARKES.

Witnesses:
J. B. McGirr,
R. A. Berrien.

Copies of this patent may be obtained for five cents each, by addressing the "Commissioner of Patents, Washington, D. C."